US008085997B2

United States Patent
Tanaka et al.

(10) Patent No.: US 8,085,997 B2
(45) Date of Patent: Dec. 27, 2011

(54) IMAGING APPARATUS AND IMAGING METHOD

(75) Inventors: Koichi Tanaka, Miyagi (JP); Masaya Tamaru, Miyagi (JP); Masahiko Sugimoto, Asaka (JP)

(73) Assignee: Fujifilm Corporation, Tokyo (JP)

( * ) Notice: Subject to any disclaimer, the term of this patent is extended or adjusted under 35 U.S.C. 154(b) by 453 days.

(21) Appl. No.: 12/273,923

(22) Filed: Nov. 19, 2008

(65) Prior Publication Data

US 2009/0129637 A1    May 21, 2009

(30) Foreign Application Priority Data

Nov. 20, 2007   (JP) ................................ 2007-300188

(51) Int. Cl.
*G06K 9/00*   (2006.01)
(52) U.S. Cl. .................... 382/118; 382/115; 382/154
(58) Field of Classification Search .................. 382/115, 382/117, 118, 154, 185, 296, 297
See application file for complete search history.

(56) References Cited

U.S. PATENT DOCUMENTS

| | | | | |
|---|---|---|---|---|
| 6,801,641 B2 * | 10/2004 | Eraslan | ......................... | 382/118 |
| 6,879,323 B1 | 4/2005 | Nagai et al. | | |
| 7,548,637 B2 * | 6/2009 | Xiong et al. | ................... | 382/118 |
| 2006/0133672 A1 | 6/2006 | Li | | |

FOREIGN PATENT DOCUMENTS

| | | |
|---|---|---|
| JP | 7-037034 A | 2/1995 |
| JP | 2001-109907 A | 4/2001 |
| JP | 2002-032743 A | 1/2002 |
| JP | 2002-251635 A | 9/2002 |
| JP | 2003-248842 A | 9/2003 |
| JP | 2004-334836 A | 11/2004 |
| JP | 2007-011970 A | 1/2007 |

* cited by examiner

*Primary Examiner* — Brian Le
(74) *Attorney, Agent, or Firm* — Birch, Stewart, Kolasch & Birch, LLP

(57) ABSTRACT

Pseudo three dimensional image data sets are generated by an imaging apparatus, such as a digital camera having face detecting functions, by a simple operation. Reference image data sets, which are employed to generate pseudo three dimensional images, are generated from first image data sets, which are recorded. When new faces are detected by a face detecting section, correlative values between through the lens image data sets that include the new faces and the reference image data sets are calculated. When the calculated correlative values are greater than a predetermined value, pseudo three dimensional images are generated from the recorded first image data sets and newly obtained second image data sets that include the new faces.

11 Claims, 18 Drawing Sheets

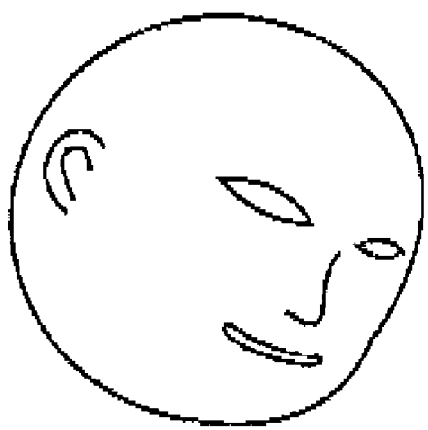
FIG.6A
FACING LEFT
FIG.6B
FACING RIGHT

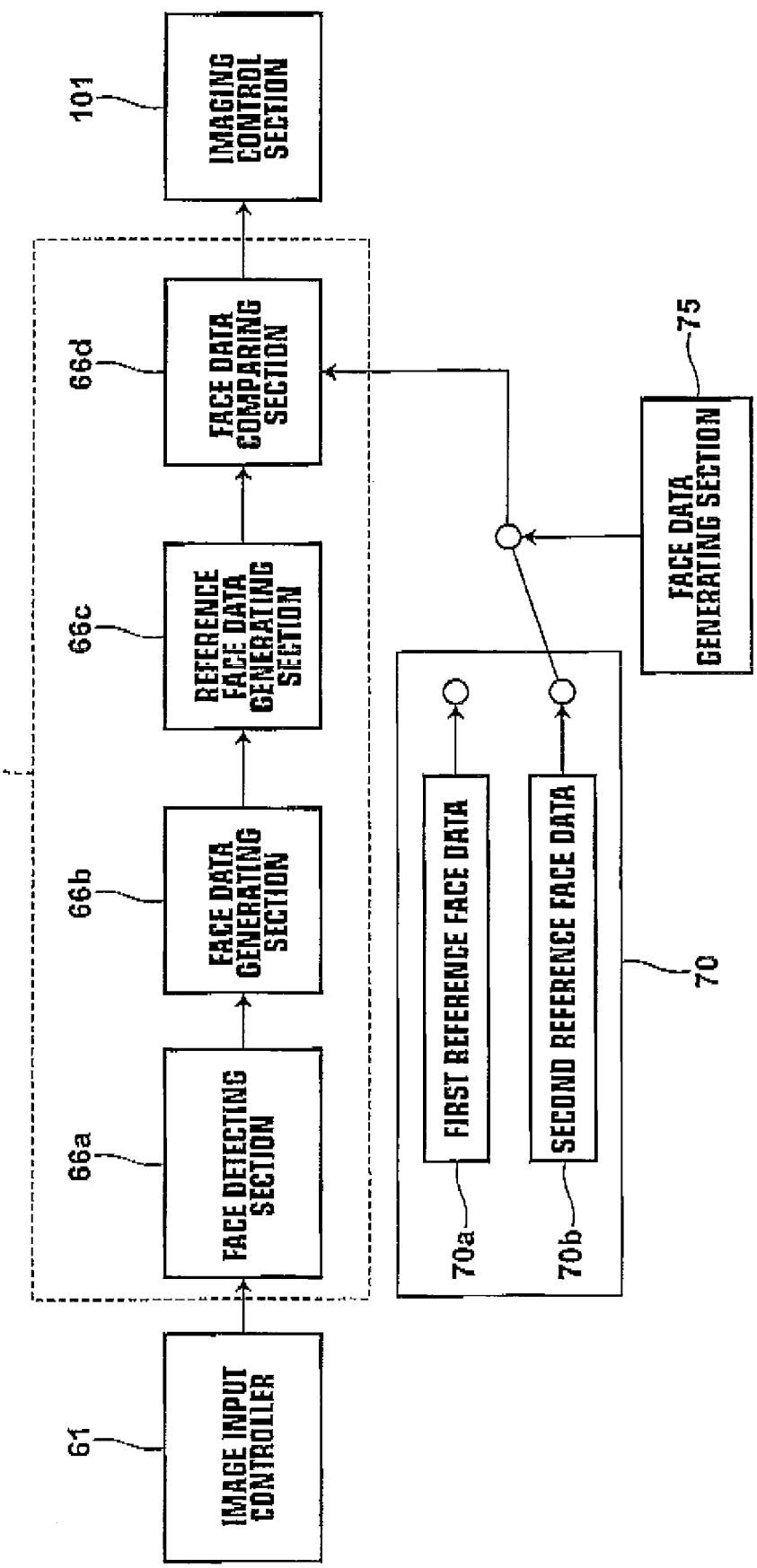

IMAGE OF PERSON

OUTLINE IMAGE
(MASK)

OUTLINE IMAGE
(PERSON)

OVERLAPPED DISPLAY
(MASK)

OVERLAPPED DISPLAY
(PERSON)

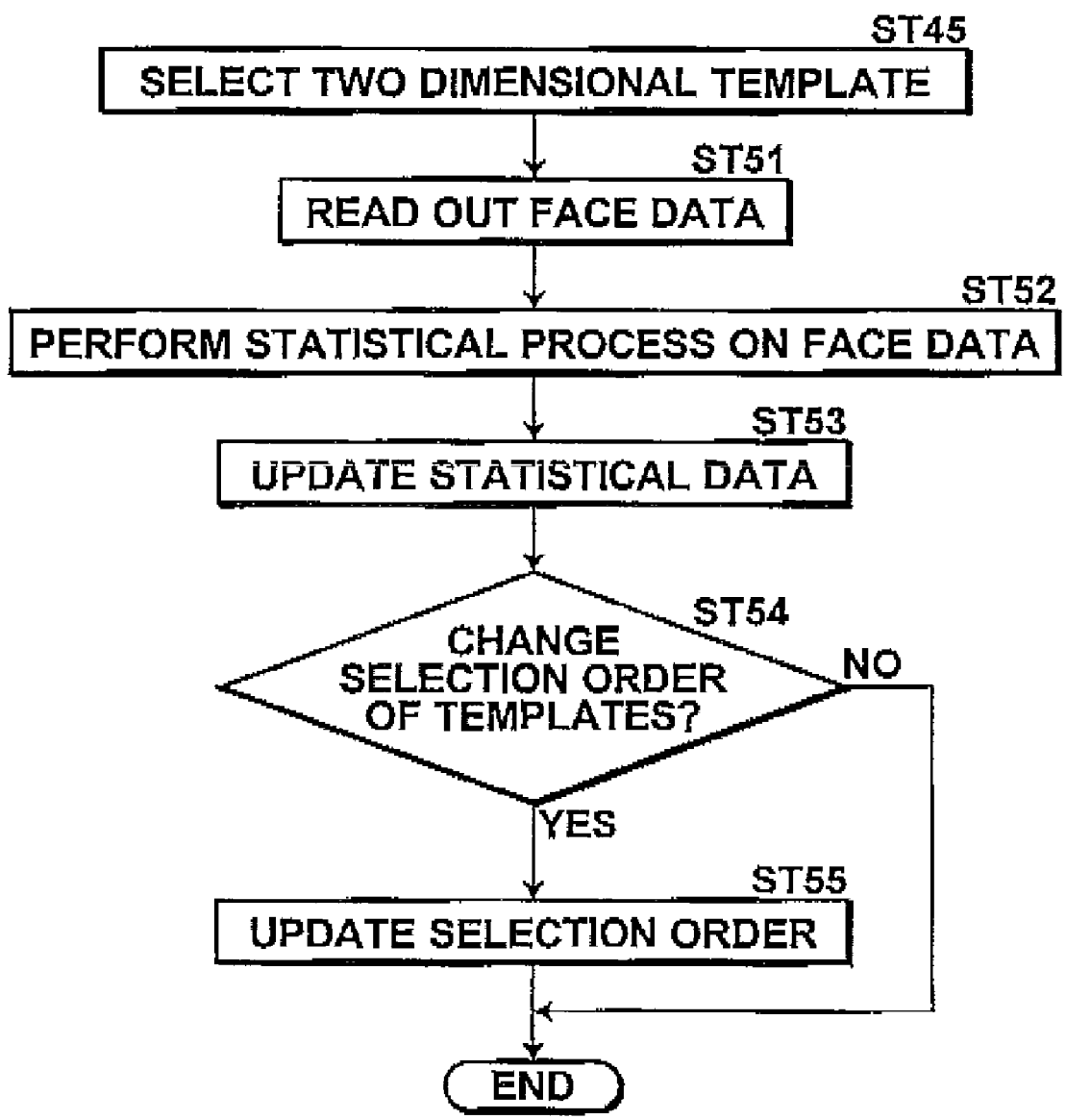

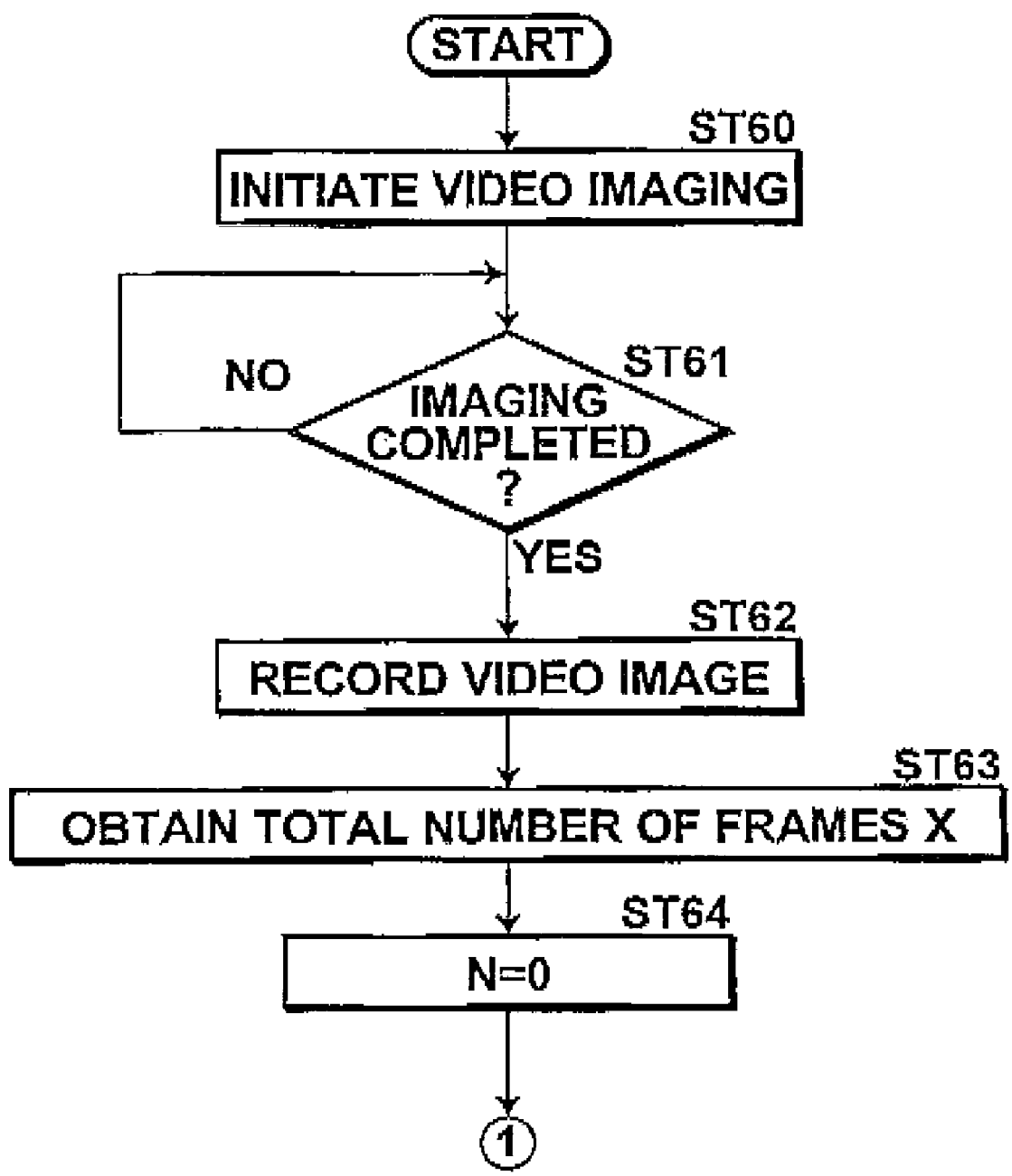

IMAGING APPARATUS AND IMAGING METHOD

BACKGROUND OF THE INVENTION

1. Field of the Invention

The present invention is related to an imaging apparatus equipped with a face detecting function. Particularly, the present invention is related to an imaging apparatus and an imaging method for generating pseudo three dimensional images from images that include detected faces.

2. Description of the Related Art

A pseudo three dimensional image generating method has been proposed, in which an imaging apparatus such as a stereoscopic camera obtains a plurality of images by photography from different angles, and then generates a pseudo three dimensional image from the obtained images. In the method disclosed in Japanese Unexamined Patent Publication No. 2002-251635, edges of the outlines and facial component regions are extracted from a plurality of image data sets of faces in profile and forward facing faces obtained by photography, based on positional data regarding predetermined portions. The extracted edges are used to generate pseudo three dimensional images.

It is desired to obtain image data sets of faces, which are photographed at angles suited for generation of pseudo three dimensional images, when obtaining the plurality of image data sets of faces in profile and forward facing faces to generate pseudo three dimensional images.

SUMMARY OF THE INVENTION

The present invention has been developed in view of the foregoing circumstances. It is an object of the present invention to provide an imaging apparatus and an imaging method that enables image data sets of faces, which are photographed at angles suited for generation of pseudo three dimensional images, to be obtained by a simple operation.

A first imaging apparatus of the present invention comprises:

an imaging section, for obtaining through the lens image data sets and image data sets by imaging subjects;

a face detecting section, for detecting faces from within the through the lens image data sets;

a recording section, for recording first image data sets obtained by the imaging section that include the faces;

a reference image generating section, for generating reference image data sets which are employed to generate pseudo three dimensional images from the recorded first image data sets;

a comparing section, for calculating correlative values between the through the lens image data that include new faces and the reference image data to compare the two, when the new faces are detected by the face detecting section;

a control section for enabling obtainment of second image data sets that include the new faces by the imaging section, when the correlative values calculated by the comparing section are greater than a predetermined value; and pseudo three dimensional image generating section, for generating pseudo three dimensional images from the second image data sets, which are obtained by the imaging section, and the first image data sets, which are recorded in the recording section.

The "reference image generating section" generates reference image data sets which are employed to generate pseudo three dimensional images from the recorded image data sets. For example, the reference image generating section may generate the reference images, by: calculating the sizes and the sideways facing angles of the faces, which are included in the first image data sets; and converting the first image data sets such that the sizes of the faces are maintained to be the same, while the sideways facing angles are changed to different angles. The "correlative values" are values that represent correlations among image data sets. For example, the correlative values may be values that represent the correlation between the sizes of faces included in an image data set that includes a face and another image data set that includes a different face. Alternatively, the correlative value may be cross correlative values among image data sets.

The "pseudo three dimensional images" are stereoscopic images which are generated by a computer from a plurality of images of a specific subject, obtained from different angles. The specific subject may be a human face.

The "first image data sets" are image data sets that include faces, obtained by the imaging section. For example, the first image data sets may be extracted facial regions detected within image data sets by the face detecting section.

The "second image data sets" are image data sets that include new faces, obtained by the imaging section. For example, the second image data sets may be extracted facial regions detected within image data sets by the face detecting section.

A second imaging apparatus of the present invention comprises:

an imaging section, for obtaining through the lens image data sets and image data sets by imaging subjects;

a face detecting section, for detecting faces from within the through the lens image data sets;

a recording section, for recording first and second reference image data sets, which are employed to generate pseudo three dimensional images; and a pseudo three dimensional image generating section, for calculating correlative values between the through the lens image data sets that include faces detected by the face detecting section and the first reference image data sets, for calculating correlative values between the through the lens image data sets that include new faces detected by the face detecting section and the second reference image data sets, and for generating pseudo three dimensional images from first image data sets which are obtained by the imaging section and include the faces when the correlative values between the through the lens image data sets that include faces detected by the face detecting section and the first reference image data sets are greater than a predetermined value, and second image data sets, which are obtained by the imaging section and include the new faces when the correlative values between the through the lens image data sets that include faces detected by the face detecting section and the second reference image data sets are greater than a predetermined value.

The second imaging apparatus of the present invention may further comprise:

a display section for displaying the through the lens image data sets; wherein:

the display section displays one of the two types of reference image data sets overlapped with the through the lens image data sets, when faces are detected by the face detecting section. In this case, the second imaging apparatus of the present invention may further comprise:

a selecting section that enables selection of the reference image data set to be displayed by the display section.

The second imaging apparatus of the present invention may further comprise:

a display section for displaying the through the lens image data sets;

an outline image generating section, for extracting outlines from the through the lens image data sets to generate outline images, when faces are detected by the face detecting section; and a mask generating section, for administering predetermined image processes onto the outline images to generate deforming mask images; wherein:

the display section displays the deforming mask images overlapped with the through the lens image data sets.

The second imaging apparatus of the present invention may further comprise:

a reference image converting section, for converting three dimensional data of the reference image data sets, which are employed to generate pseudo three dimensional images, to generate the first and second reference image data sets; wherein:

the recording section records the first and second reference image data sets, which have been converted by the reference image converting section, and the three dimensional data. In this case, the second imaging apparatus of the present invention may further comprise:

a display section for displaying the through the lens image data sets;

an outline image generating section, for extracting outlines from the through the lens image data sets to generate outline images, when faces are detected by the face detecting section; and a mask generating section, for administering predetermined image processes onto the outline images to generate deforming mask images; wherein:

the display section displays the deforming mask images overlapped with the through the lens image data sets.

The second imaging apparatus of the present invention may further comprise:

reference image converting means, for converting three dimensional data of the reference image data sets, which are employed to generate pseudo three dimensional images, to generate the first and second reference image data sets; wherein:

the recording means records the first and second reference image data sets, which have been converted by the reference image converting means, and the three dimensional data. A first imaging method of the present invention comprises the steps of:

obtaining through the lens image data sets by imaging subjects;

detecting faces from within the through the lens image data sets;

recording first image data sets obtained by the imaging section that include the faces;

generating reference image data sets which are employed to generate pseudo three dimensional images from the recorded first image data sets;

calculating correlative values between the through the lens image data that include new faces and the reference image data to compare the two, when the new faces are detected by the face detecting section;

obtaining second image data sets that include the new faces, when the calculated correlative values are greater than a predetermined value; and generating pseudo three dimensional images from the first image data sets and the second image data sets.

A second imaging method of the present invention comprises the steps of:

obtaining through the lens image data sets by imaging subjects;

detecting faces from within the through the lens image data sets;

recording first and second reference image data sets, which are employed to generate pseudo three dimensional images, in advance;

calculating correlative values between the through the lens image data sets that include detected faces and the first reference image data sets, and obtaining first image data sets when the calculated correlative values are greater than a predetermined value;

calculating correlative values between the through the lens image data sets that include new faces and the second reference image data sets when the new faces are detected, and obtaining second image data sets that include the new faces when the calculated correlative values are greater than a predetermined value; and generating pseudo three dimensional images from the first image data sets and the second image data sets.

A first imaging program of the present invention causes a computer to execute the functions of:

obtaining through the lens image data sets by imaging subjects;

detecting faces from within the through the lens image data sets;

recording first image data sets obtained by the imaging section that include the faces;

generating reference image data sets which are employed to generate pseudo three dimensional images from the recorded first image data sets;

calculating correlative values between the through the lens image data that include new faces and the reference image data to compare the two, when the new faces are detected by the face detecting section;

obtaining second image data sets that include the new faces, when the calculated correlative values are greater than a predetermined value; and generating pseudo three dimensional images from the first image data sets and the second image data sets.

A second imaging program of the present invention causes a computer to execute the functions of:

obtaining through the lens image data sets by imaging subjects;

detecting faces from within the through the lens image data sets;

recording first and second reference image data sets, which are employed to generate pseudo three dimensional images, in advance;

calculating correlative values between the through the lens image data sets that include detected faces and the first reference image data sets, and obtaining first image data sets when the calculated correlative values are greater than a predetermined value;

calculating correlative values between the through the lens image data sets that include new faces and the second reference image data sets when the new faces are detected, and obtaining second image data sets that include the new faces when the calculated correlative values are greater than a predetermined value; and generating pseudo three dimensional images from the first image data sets and the second image data sets.

Here, the imaging apparatus of the present invention is not limited to being constituted by a single device. For example, cases in which a plurality of devices, such as an imaging device (a digital camera, for example) and a display device (a television set, for example) are physically connected or wirelessly connected to constitute the imaging apparatus, are also included.

Note that the programs of the present invention may be provided being recorded on a computer readable medium. Those who are skilled in the art would know that computer readable media are not limited to any specific type of device, and include, but are not limited to: floppy disks, CD's, RAM's, ROM's, hard disks, magnetic tapes, and internet downloads, in which computer instructions can be stored and/or transmitted. Transmission of the computer instructions through a network or through wireless transmission means is also within the scope of this invention. Additionally, computer instructions include, but are not limited to; source, object, and executable code, and can be in any language, including higher level languages, assembly language, and machine language.

In the imaging apparatuses, and the imaging methods of the present invention, the reference image data sets, which are employed to generate pseudo three dimensional images, are generated from the recorded first image data sets. When new faces are detected by the face detecting section, correlative values between the through the lens images that include the new faces and the reference images are calculated. The pseudo three dimensional images are generated from the recorded first image data sets and the second image data sets, which are obtained when the correlative values are greater than the predetermined value. Therefore, two dimensional image data sets of faces which are obtained at facing angles suitable for generating pseudo three dimensional images can be obtained by a simple operation. Accordingly, appropriate pseudo three dimensional images can be generated.

In addition, the present invention enables obtainment of two dimensional image data sets of faces at facing angles suitable for generating pseudo three dimensional images even in cases that single monocular imaging devices are utilized.

BRIEF DESCRIPTION OF THE DRAWINGS

FIGS. 6A and 6B illustrate examples of images which are necessary to generate pseudo three dimensional images.

FIG. 7 is a functional block diagram of a second embodiment of the present invention.

FIG. 15 is a flow chart that illustrates the sequence of steps of a template selection process in the third embodiment of the present invention.

FIG. 17A is a first flow chart that illustrates the sequence of steps of a process according to the fourth embodiment of the present invention.

BEST MODE FOR CARRYING OUT THE INVENTION

Hereinafter, an embodiment of the present invention will be described with reference to the accompanying drawings.

Figure 1:
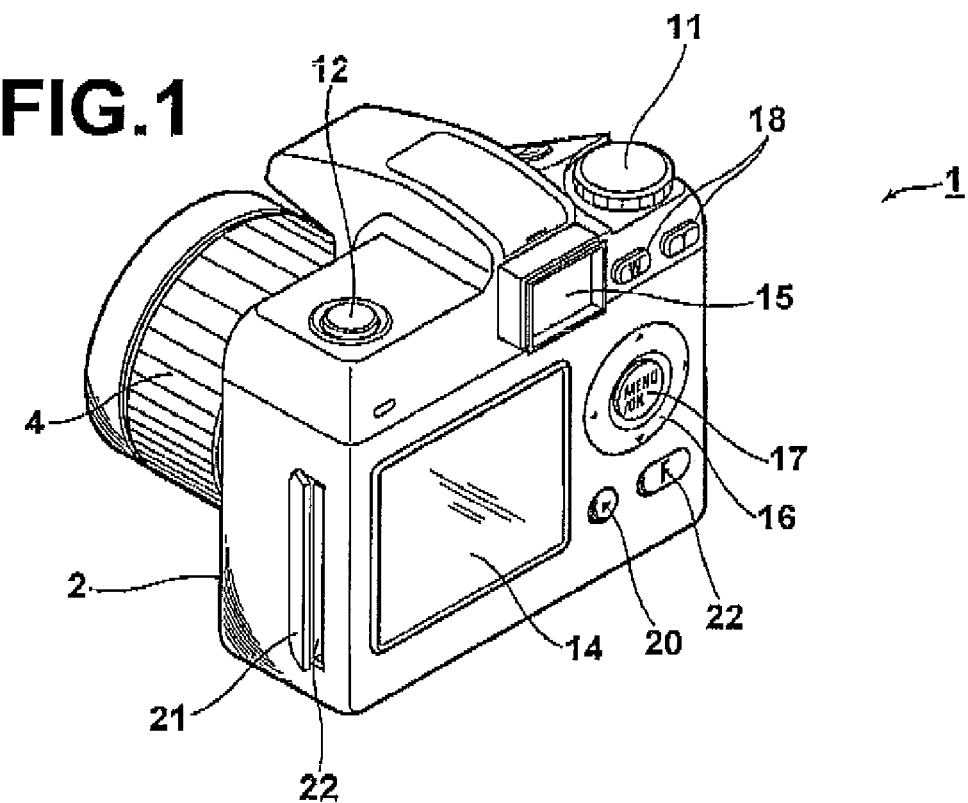
FIG. 1 is a perspective view of a digital camera 1 from the rear thereof.
Figure 2:
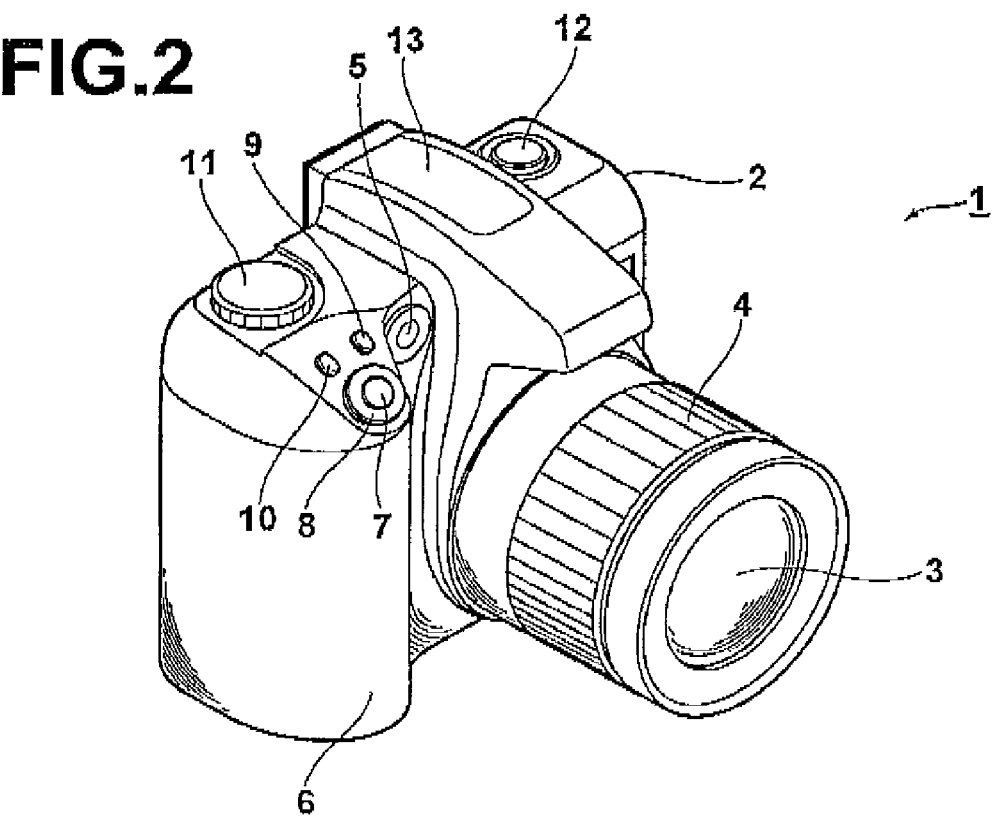
FIG. 2 is a perspective view of the digital camera of FIG. 1 from the front thereof.

FIG. 1 and FIG. 2 illustrate an example of a digital camera 1. FIG. 1 is a perspective view of the digital camera 1 from the rear thereof, and FIG. 2 is a perspective view of the digital camera 1 from the front thereof. As illustrated in FIG. 1, the digital camera 1 has an operation mode switch 11, a menu/OK button 17, a zoom in/zoom out buttons 18, cruciform key 16, a Display/Back button 20, and a photography mode button 22, which are provided at the rear of a body 2 thereof. In addition, the digital camera 1 is equipped with a viewfinder 15 for photography, a monitor 14 for photography and playback, and a shutter release button 7.

The operation mode switch 11 is a slide switch for changing the photography mode (such as landscape, night scene, ocean, snow, mountain, flowers, sunset, party, people, baby, sports, and pets mode), and selecting a face detecting mode of the digital camera 1.

By pressing the menu/OK button 17, various menus for settings, such as self timer ON/OFF, the number of pixels to be recorded, imaging element sensitivity, etc. are displayed on the monitor 14. The menu/OK button is also used to confirm settings and selections based on the menus displayed on the monitor 14.

When the zoom in/zoom out buttons 18 are pressed during photography, zooming of the camera can be adjusted for telephotography or wide angle photography.

The cruciform key 16 is used to move a cursor vertically and horizontally in a menu screen displayed on the monitor 14 during input of various settings.

Pressing the Display/Back button 20 stops setting operations and displays an immediately preceding screen on the monitor 14. Pressing the Display/Back button 20 during playback enables change of the display method of the monitor 14.

The viewfinder 15 is for a user to view through to set composition and focus during photograph. Images of subjects which are viewable through the viewfinder 15 are transmitted through a viewfinder window provided in the front surface of the body 2.

The shutter release button 7 is a button which is capable of a two step operation that includes half depression and full depression. When the shutter release button 7 is depressed, a half press signal or a full press signal is transmitted to a CPU 75 via an operation system control section 74 to be described later.

The contents of settings, input through operation of the buttons, the lever, and the switch, can be confirmed by display on the monitor 14, a lamp in the viewfinder, and the position of the slide lever, for example. The monitor 14 functions as an electronic viewfinder by displaying through the lens images for confirmation of the subject at the time of photography. The monitor 14 also displays a still image or a moving image, which is played back after photography, in addition to the various kinds of menus.

As illustrated in FIG. 2, an imaging lens unit 3, a zoom ring 4, a power source lever 8, a flash 13, and an AF auxiliary lamp/self timer lamp 5 are provided on the front surface of the body 2. A media slot 22 is provided in the side surface of the body 2.

The imaging lens unit 3 focuses images of subjects on a predetermined image forming surface (such as a CCD or a CMOS within the main body 2), and is constituted b a focus lens, a zoom lens, and the like.

The power source lever 8 is a lever for switching the digital camera 1 ON and OFF. The power source lever 8 is also a lever for switching the operating mode of the digital camera 1 from among modes such as: a still imaging mode; a video imaging mode; and a playback mode.

The flash 13 emits momentarily emits light necessary for imaging toward subjects when the shutter release button 7 is depressed and a shutter within the body 2 is open. The flash 13 is constituted by a xenon bulb, but light emitting elements other than xenon bulbs may be employed as the flash 13.

The AF auxiliary lamp/self timer lamp 5 emits light to let subjects know the timing of a shutter opening/closing operation, that is, the initiation and cessation of exposure, when performing imaging using a self timer. In addition, the AF auxiliary lamp/self timer lamp 5 emits light which is used for automatic focusing.

The media slot 22 is an opening into which an external recording medium 70, such as a memory card, is loaded. Data is written into and read out from the external recording medium 70 when it is loaded within the media slot 22.

Figure 3:
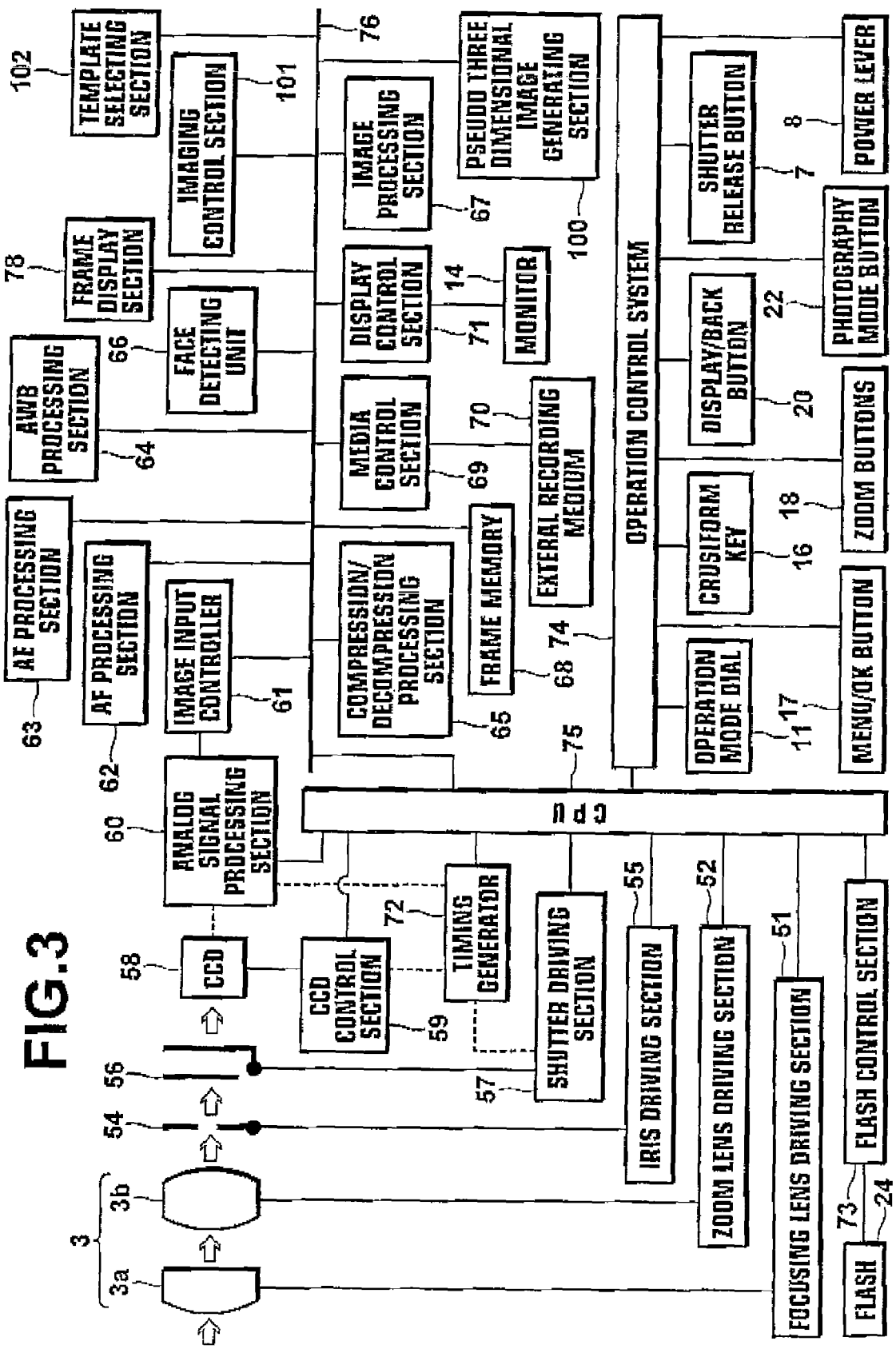
FIG. 3 is a block diagram showing the functional configuration of the digital camera of FIG. 1.

FIG. 3 is a block diagram showing the functional configuration of the digital camera 1. As illustrated in FIG. 3, the digital camera 1 has an operational system including the operation mode switch 11, the menu/OK button 17, the zoom in/zoom out buttons 18, the cruciform key 16, the Display/Back button 20, the power source lever 8, the photography mode button 22, the shutter release button 7, and the power switch 22 described above. In addition, an operational system control section 74 that functions as an interface for sending the contents of operations to a CPU 75 is also provided in the operating system.

The imaging lens unit 3 comprises a focusing lens 3a and a zoom lens 3b. Each of the lenses can he moved along their optical axis in a stepped manner by a focusing lens driving section 51 and a zoom lens driving section 52 each comprising a motor and a motor driver.

The focusing lens driving section 51 controls the movement of the focusing lens 3a, based on focus driving data output from an AF processing section 62. The zoom lens driving section 52 controls the movement of the zoom lens 3b, based on data representing the operation of the zoom in/zoom out buttons 18.

An iris 54 is driven by an iris driving section 55 comprising a motor and a motor driver. The iris driving section 55 adjusts the diameter of the iris 54 based on iris-value data output from an AE (Automatic Exposure) processing section 63.

A shutter 56 is a mechanical shutter and is driven by a shutter driving section 57 comprising a motor and a motor driver. The shutter driving section 57 opens and closes the shutter 56 according to a signal generated by depressing the shutter release button 7 and according to shutter speed data output from the AE processing section 63.

A CCD 58 (imaging section) is provided as an imaging device and located at the rear of the optical system described above. The CCD 58 has a photoelectric surface, on which a plurality of photoreceptor elements are arranged in a matrix. Light from the subject passing through the optical system forms an image on the surface and is subjected to photoelectric conversion. A micro-lens array (not shown) for focusing the light on each pixel and a color filter array (not shown), in which filters for R, G, and B colors are arranged regularly, are located in front of the photoelectric surface.

The CCD 58 outputs an electric charge stored at each of the pixels as serial analog image data for each line while synchronizing with a vertical transfer clock signal and a horizontal transfer clock signal supplied from a CCD control section 59. The time during which the electric charge is stored at each of the pixels, that is, an exposure time, is determined by an electronic shutter driving signal output from the CCD control section 59.

Analog image data output from the CCD 58 is input to an analog signal processing section 60. The analog signal processing section 60 comprises a correlated double sampling (CDS) circuit for removing noise from the analog image signal, an automatic gain controller (AGC) for adjusting a gain of the analog image signal, and an A/D converter (ADC) for converting the analog image data into digital image data. The digital image data are CCD-RAW data having density values of R, G, and B for each of the pixels.

A timing generator 72 generates timing signals. Feeding of the timing signals to the shutter driving section 57, the CCD control section 59, and the analog signal processing section 60 synchronizes the operation of the shutter release button 7 with the opening/closing of the shutter 56, input of the electric charge of the CCD 58, and processing by the analog signal processing section 60.

A flash control section 73 controls light emission from the flash 13.

An image input controller 61 writes the CCD-RAW data input from the analog signal processing section 60 in a frame memory 68. The frame memory 68 is a memory used as workspace for various types of digital image processes (signal processing) on the image data, which will be described later, and comprises an SDRAM (Synchronous Dynamic Random Access Memory) that carries out data transfer in synchronization with a bus clock signal of a predetermined period, for example.

A display control section 71 is used to display the image data stored in the frame memory 68 as a through the lens image on the monitor 14. The display control section 71 converts luminance (Y) signals and color (C) signals into unified composite signals, and outputs the composite signals to the monitor 14. The through the lens image is obtained at predetermined intervals and displayed on the monitor 14 when the photography mode is selected.

Further, a face detecting unit 66 detects human faces from within the through the lens image data sets or the image data sets.

The method disclosed in U.S. Patent Application Publication No. 20060133672 (hereinafter, referred to as Reference Document 1) may be employed, for example. In this method, known techniques such as movement vectors and feature detection, or a machine learning technique based on Adaboost is utilized to track faces. Adaboost is a technique in which learning data is continuously renewed at each re-sampling operation, to create machines, then the machines are weighted and combined to form an integrated learning machine. For example, an average frame model may be fitted into an actual image of a face, and the positions of landmarks (eyes and mouth, for example) within the average frame model may be moved to match the positions of corresponding landmarks which have been detected in the image of the face, thereby deforming the average frame model to construct a frame model of the face. Classifiers and classifying conditions for each landmark are obtained by learning brightness profiles of points within a plurality of sample images, which are known to be of predetermined landmarks, and brightness profiles of points within a plurality of sample images, which are known not to be of predetermined landmarks. The classifiers and classifying conditions are employed to detect points within the image of the face that represent the landmarks.

Alternatively, the method disclosed in Japanese Unexamined Patent Publication No. 2004-334836 (hereinafter, referred to as Reference Document 2) may be employed. This method utilizes a characteristic portion extraction technique, in which: image data sets of a predetermined size are cut out from a target image data set; and each cut out image data set is compared against image data sets representing characteristic portions; to detect whether images of characteristic portions are present within the target image. Note that faces of animals may also be detected as specific subjects in addition to human faces, as disclosed in Japanese Unexamined Patent Publication No. 2007-011970 (hereinafter, referred to as Reference Document 3). Regions having features of faces therein (being of skin color, having eyes, having the shape of a face) may be detected as facial regions.

A method for detecting faces may be employed that detects not only forward facing faces, but also faces in profile and the backs of heads.

The AF processing section 62 detects a focusing position for a face detected by the face detecting unit 66 with respect to a tracing frame displayed by a frame display section 78, and outputs focus driving data. A passive method, in which a characteristic that the contrast of images increases in a focused state is utilized, may be employed, for example. Alternatively, an active method, in which measurement results of distances obtained by a distance sensor (not shown) is utilized, may be employed.

The AE processing section 63 measures the luminance of the subject within the tracking frame (refer to F1 in FIG. 13), and determines an iris value, a shutter speed, and the like based on the luminance. The AE processing section then outputs the data of the iris value and the shutter speed.

An image processing section 67 administers image quality enhancement processes such as Gamma correction, sharpness correction, and contrast correction on image data of a final image. The image processing section 67 also administers YC processes to convert the CCD-RAW data into Yc data comprising Y data as a luminance signal, Cb data as a blue color difference signal, and Cr data as a red color difference signal.

The final image is an image based on the image data stored in the frame memory 68 via the analog signal processing section 60 and the image input controller 61 after input of the analog image data from the CCD 58, in response to a full depression of the shutter release button 7.

The maximum number of pixels of the final image is determined by the number of the pixels of the CCD 58. However, the number of pixels to be recorded can be changed by the user, by setting the image quality to fine or normal, for example. The number of pixels of the through the lens image and the preliminary image may be less than that of the final image, and may be 1/16 that of the final image, for example.

A compression/decompression unit 65 carries out compression processes to a format such as JPEG on the image data, which has been subjected to the image enhancement processes and the like by the image processing section 67, and generates an image file. Accompanying information is added as tags to the image file, based on various data formats. The compression/decompression unit 65 also reads out compressed images files from the external recording medium 70 in the playback mode, and administers decompression processes thereon. Image data, on which the decompression processes have been administered, are displayed on the monitor 14.

A media control section 69 corresponds to the media slot 22 of FIG. 2, and carries out image-file reading and writing from and to the external recording medium 70.

The CPU 75 controls each of the units of the digital camera 1 in response to operations input to the operational system, such as the operation mode switch 11, as well as signals from the various processing sections, such as the AF processing section 62. addition, the CPU 75 also functions as a recording means for recording image files in an internal memory (not shown).

A data bus 76 is connected to the image input controller 61, the various processing sections 62 through 69, 78, 100 through 102, and the CPU 75. Various signals, data, and the like are transmitted through the data bus 76.

Figure 4:
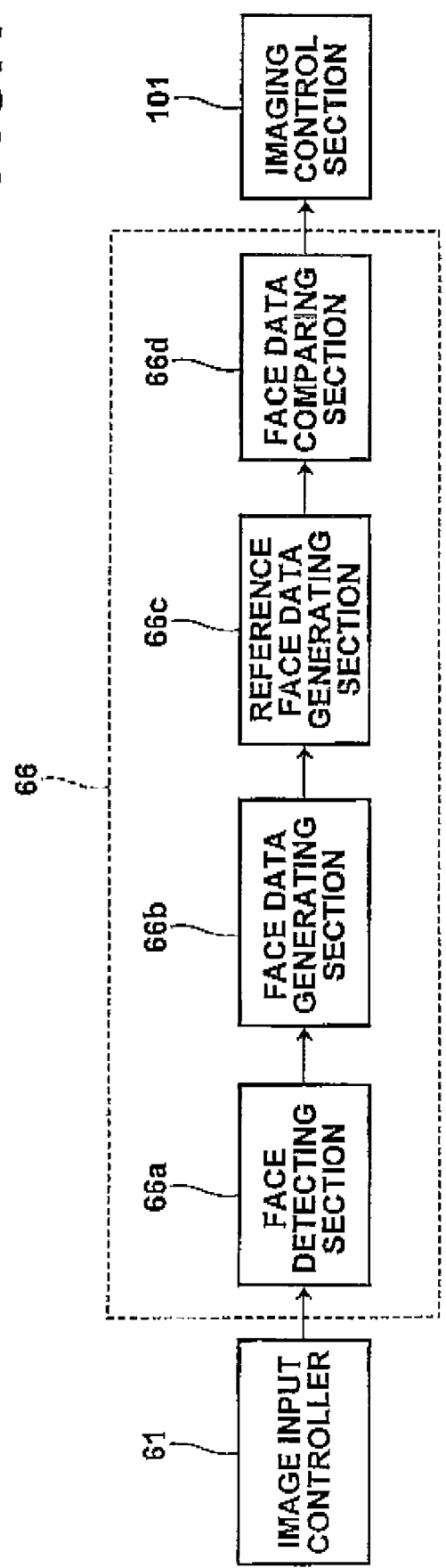
FIG. 4 is a block diagram that illustrates the structures for generating reference images in a first embodiment of the present invention.

FIG. 4 is a block diagram that illustrates the configuration of the face detecting unit 66 of the digital camera 1. A face detecting section 66a detects human faces from within the through the lens image data sets or from within the image data sets, using the aforementioned methods (refer to Reference Documents 1 through 3).

A face data generating section 66b generates face data X from the portions of image data sets that include faces which are detected by the face detecting section 66a. The face data X includes additional data regarding the faces, such as the facing angle (the sideways facing angles of faces, for example) and the sizes of the faces.

Note that the reference face data to be described later is also not limited to image data, but also includes additional data regarding the faces, such as the facing angle (the sideways facing angle of faces, for example) and the sizes of the faces.

The sideways facing angles of faces represent the facing direction of peoples' faces with respect cameras at the time of photography. The sideways facing angles are calculated by the sizes and relative positions of facial components (landmarks and landmark groups, for example), which are detected by the face detecting section 66a. For example, the lengths in the horizontal direction of a detected left eye and a detected right eye of a person may be compared. In the case that the length of the left eye in the horizontal direction is longer than that of the right eye, it can be judged that the person was facing rightward at the time of photography.

A reference face data generating section 66c generates reference face data Y, employing the face data X generated by the face data generating section 66b. For example, the sizes of faces may be maintained to be the same, and the sideways facing angle may be inverted, to generate the reference face data Y.

A face data comparing section 66*d* compares the face data X against the reference face data Y, by calculating correlative values that represent the correlative relationship (correlation) between the two. If the correlative value is high as a result of the comparison, the face data comparing section 66*d* judges that faces are in a desired state.

An imaging control section 101 controls the imaging section to obtain image data that includes new faces, when the correlative values obtained by the face data comparing section 66*d* are high.

Figure 5:
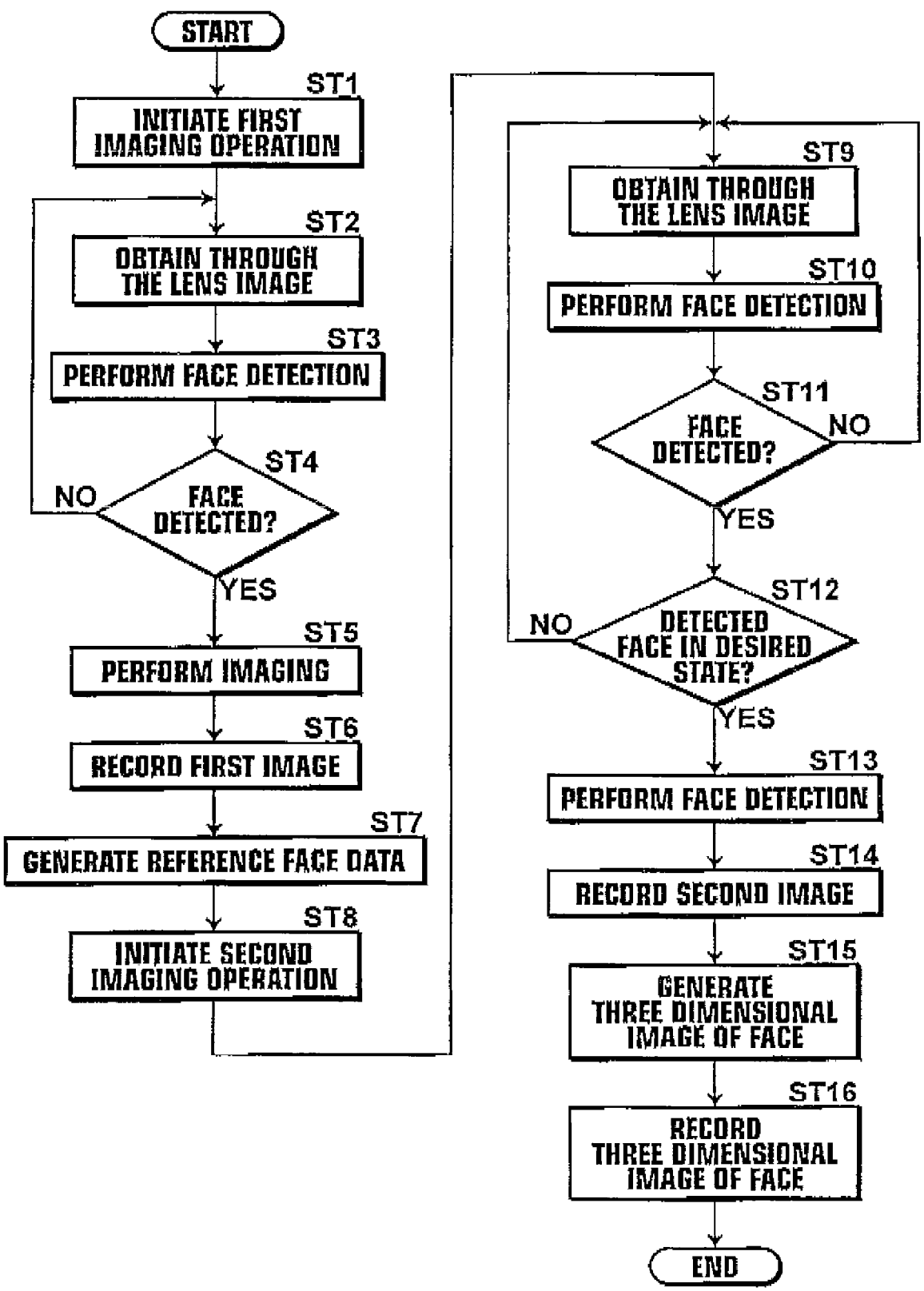
FIG. 5 is a flow chart that illustrates the sequence of steps of a process according to the first embodiment of the present invention.

Next, a process according to a first embodiment performed by the digital camera 1 will be described. FIG. 5 is a flow chart that illustrates the sequence of steps of the process. First, as illustrated in FIG. 5, a first imaging operation is initiated (stop ST1). The face detecting section 66*a* obtains a through the lens image data set from the image input controller 61 (step ST2), and performs face detection with respect to the through the lens image data set (step ST3). In the case that a face is not detected by the face detecting section 66*a* (step ST4: NO), the face detecting section 66*a* repeatedly performs face detection.

On the other hand, in the case that a face is detected by the face detecting section 66*a* (step ST4: YES), the display control section 71 displays the detected race on the monitor 14 overlapped by a frame or the like (refer to F1 of FIG. 13). Imaging is initiated when the user depresses the shutter release button 7 (step ST5).

The face data generating section 66*b* generates face data X from a first image data set which is obtained by the imaging operation, and records the face data X in the external recording medium 70 (step ST6). The first image data set is also recorded in the external recording medium 70. The reference face data generating section 66*c* generates first reference face data Y from the recorded first face data X (step ST7).

For example, in the case that the first face data X indicates a leftward facing face, as illustrated in FIG. 6A, data regarding the left size of the face is missing when a pseudo three dimensional image data set is to be generated. Therefore, it is desirable to obtain an image data set that includes a rightward facing face in a second imaging operation (refer to FIG. 6B). Accordingly, the reference face data generating section 66*c* generates reference face data Y, based on the sizes and relative positions of the facial components (landmarks or groups of landmarks, for example) detected by the face detecting section 66*a*, from the face data X. For example, the size of the face is maintained is maintained to be the same, and the sideways facing angle is inverted to generate the reference face data Y that represents an image data set that includes a rightward facing face. In the following description, a forward facing face will be designated as zero degrees, leftward facing angles will be designated as being positive angles, and rightward facing angles will be designated as being negative angles. The generated face data X and the reference face data Y are recorded in the external recording medium 70. The generated face data X and the reference face data Y may also be recorded in the frame memory 68.

Next, a second imaging operation is initiated (step ST8). The face detecting section 66*a* obtains a through the lens image data set (step ST9), and performs face detection within the through the image data set obtained by the image input controller 61 (step ST10). In the case that a face is not detected by the face detecting section 66*a* (step ST11: NO), the face detecting section 66*a* repeatedly performs face detection.

On the other hand, in the case that a face is detected by the face detecting section 66*a* (step ST11: YES), the face data generating section 66*b* generates face data X' from the portion of the image data set that includes the newly detected face, and records the face data X' in the external recording medium 70. The face data comparing section 66*d* compares the second face data X' newly generated by the face data generating section 66*b* and the reference face data Y generated by the reference face data generating section 66*c*, by calculating the correlative value therebetween. In the case that the correlative value is high, and the detected face is in a desired state (step ST12: YES), the imaging control section 191 judges that imaging is possible, and controls the digital camera 1 to automatically perform imaging. Before the imaging operation is administered, the face detecting section 66*a* detects the new face again (step ST13). The imaging operation is performed, then a second image data set and second face data X', which is generated again from the second image data set that includes the new face which was detected again, are recorded in the external recording medium 70 (step ST14). On the other hand, in the case that the correlative value is low and the detected face is judged not to be in a desired state (step ST11: NO), face detection is performed again.

Here, the "correlative value" is the difference in the sizes of faces of the second face data X' and the reference face data Y, for example. The correlative value becomes high when the size of the face of the second face data X' is approximately equal to the size of the face of the reference face data Y. In order to judge that the correlative value is high, a threshold value may be provided with respect to the difference in face sizes, and the correlative value may be judged to be high if the difference in face sizes is less than or equal to the threshold value. Similarly, a threshold value may be set for the sideways facing angles of the faces, and the correlative value with respect to the sideways facing angle may be judged to be high or low.

The cross correlation value calculated by the technique disclosed in Japanese Unexamined Patent Publication No. 7(1995)-037034 (hereinafter, referred to as Reference Document 4) may also be used as the correlative value.

The pseudo three dimensional image generating section 100 generates a pseudo three dimensional image data set from the recorded first face data X and the recorded second face data X' (step ST15). The generated pseudo three dimensional image data set is recorded in the external recording medium 70 (step ST16).

Note that the pseudo three dimensional image generating section 100 generates the pseudo three dimensional image data set from the recorded first image data set and the recorded second image data set. The generated pseudo three dimensional image data set is recorded in the external recording medium 70. The first image data set may be the entire image data set, or the portion of the image data set extracted by the face detecting section 66*a* that includes the face region (for example, the first face data X). The second image data set may be the entire image data set, or the portion of the image data set extracted by the face detecting section 66*a* that includes the face region (for example, the second face data X').

Known techniques may be applied to generate the pseudo three dimensional image data set. For example, the technique disclosed in Japanese Unexamined Patent Publication No. 2003-248842 (hereinafter, referred to as Reference Document 5) may be employed by the imaging apparatus of the present invention. In this technique, facial features, which are necessary to specify an individual, are extracted from image data obtained by imaging the head of a subject from the front and from the side. Three dimensional structures of facial components, such as the skeletal structure of the head, the nose, the mouth, the eyebrows, and the eyes are reproduced based on the extracted facial features. Then, the facial components are integrated to reproduce the three dimensional shape of the face.

The reference face data Y is generated from the first face data X, and the digital camera 1 is controlled to automatically perform imaging. Thereby, a second imaging operation to obtain missing data, which is necessary to generate the pseudo three dimensional image, is assisted.

Note that the imaging control section 101 is not limited to automatically controlling the imaging operation. Alternatively, the imaging control section 101 may control the digital camera 1 such that imaging is not performed until the detected face is judged to be in a desired state, even if the shutter release button 7 is depressed. The imaging control section 101 may control the digital camera 1 such that imaging is enabled by depressing the shutter release button 7, only after it is judged that the detected face is in a desired state.

Next, a process according to a second embodiment performed by the digital camera 1 having the above construction will be described.

FIG. 7 is a block diagram that illustrates the construction of the face detecting unit 66 of the digital camera 1. Here, only components which are different from those of the first embodiment will be described. Components which are the same as those of the first embodiment will be denoted with the same reference numerals, and detailed descriptions thereof will be omitted.

In the second embodiment, the first reference face data Y and a second reference face data Y' are recorded in an external recording medium 70a and an external recording medium 70b in advance. Table 1 illustrates an example of prerecorded reference face data. For example, the reference face data includes the sizes of faces, the sideways facing angles of faces, and the positions of faces.

TABLE 1

| | Type of Reference Data | |
|---|---|---|
| | First Reference Face Data | Second Reference Face Data |
| Size of Face | Half the Height of Image | Half the Height of Image |
| Sideways Facing Angle (Forward Facing Faces Designated as 0 Degrees) | 10 Degrees | −10 Degrees |
| Position of Face | Center of Image | Center of Image |

Figure 8:
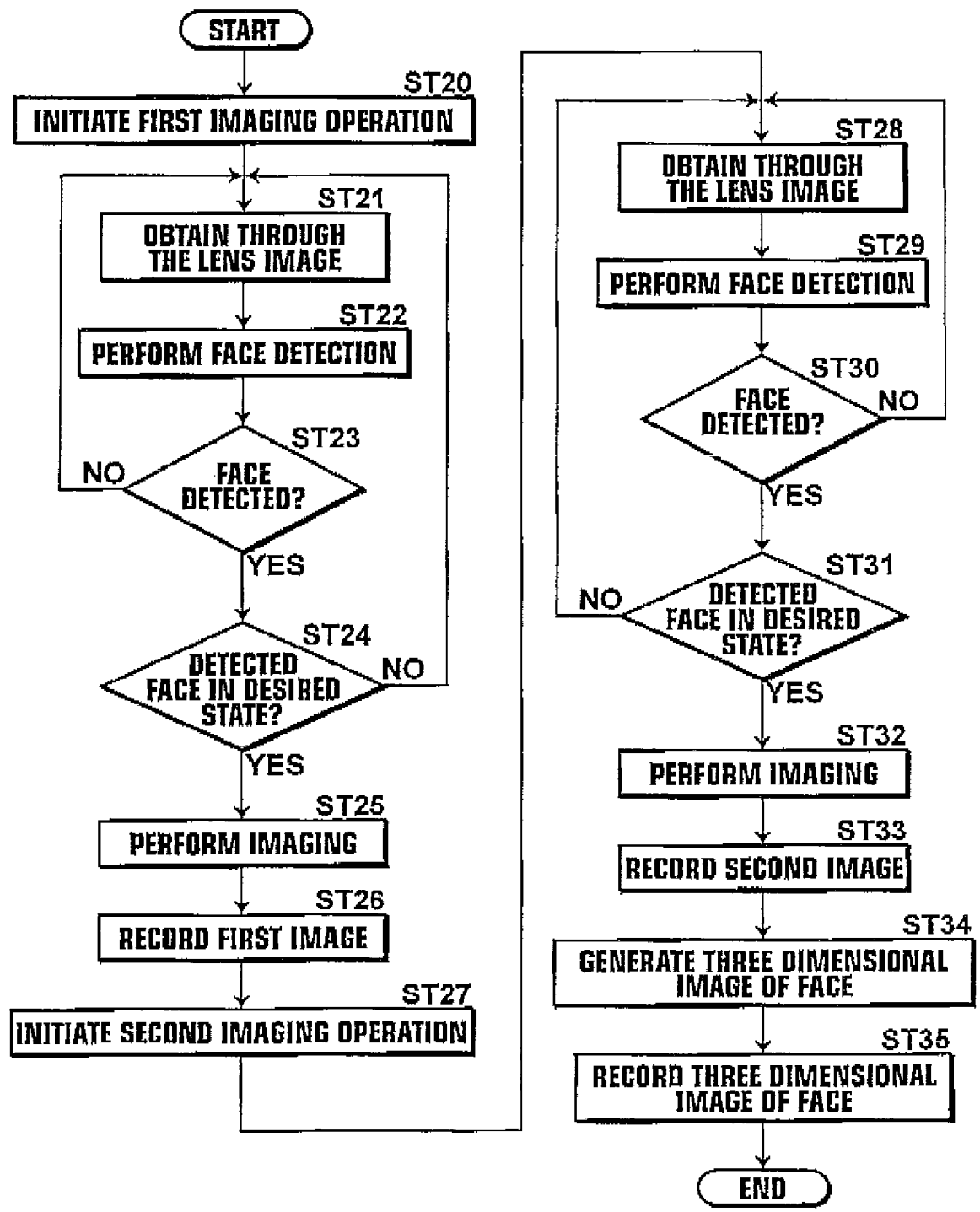
FIG. 8 is a flow chart that illustrates the sequence of steps of a process according to the second embodiment of the present invention.

FIG. 8 is a flow chart that illustrates the sequence of steps of the process performed by the digital camera 1. As illustrated in FIG. 8, a first imaging operation is Initiated (step ST20). Then, the face detecting section 66a obtains a through the lens image data set from the image input controller 61 (step ST21), and performs face detection with respect to the through the lens image data set (step ST22). In the case that a face is not detected by the face detecting section 66a (step ST23: NO), the face detecting section 66a repeatedly performs face detection.

On the other hand, in the case that a face is detected by the face detecting section 66a (step ST23: YES), the face data comparing section 66d compares the detected first face data X with the first reference face data Y, by calculating a correlative value therebetween. In the case that the correlative value is high, the fact that the correlative value is high is indicated on the monitor by an icon or as text. In the case that the detected face is judged to be in a desired state (step ST24: YES), the imaging control section 101 judges that imaging is possible, and controls the digital camera 1 to automatically perform imaging (step ST25). The face data generating section 66b generates face data X from a first image data set which is obtained by the imaging operation, and records the face data X in the external recording medium 70 (step ST26). On the other hand, in the case that the correlative value is low and the detected face is judged not to be in a desired state (step ST24: NO), the face detecting section 66a performs face detection again.

Thereafter, a second imaging operation is initiated (step ST27). First, the face detecting section 66a obtains a through the lens image data set from the image input controller 61 (step ST28), and performs face detection within the through the image data set (step ST29). In the case that a face is not detected by the face detecting section 66a (step ST30: NO), the face detecting section 66a repeatedly performs face detection.

In the case that a face is newly detected by the face detecting section 66a (step ST30: YES), the face data comparing section 66d compares the detected second face data X' with the second reference face data Y', by calculating a correlative value therebetween. In the case that the correlative value is high and the detected face is judged to be in a desired state (step ST31: YES), the imaging control section 101 controls the digital camera 1 to automatically perform imaging (step ST32). A second image data set obtained by the imaging operation and second face data X' are recorded in the external recording medium 70 (step ST33).

On the other hand, in the case that the correlative value is low and the detected face is judged not to be in a desired state (step ST31: NO), the face detecting section 66a performs face detection again. Note that the method by which the correlative value is judged to be high or low may be the same as that employed in the first embodiment. The pseudo three dimensional image generating section 101 generates a pseudo three dimensional image data set from the recorded first face data X and the recorded second face data X' (step ST34). The generated pseudo three dimensional image data set is recorded in the external recording medium 70 (step ST35).

Note that the pseudo three dimensional image generating section 100 generates the pseudo three dimensional image data set from the recorded first image data set and the recorded second image data set. The generated pseudo three dimensional image data set is recorded in the external recording medium 70. The first image data set may be the entire image data set, or the portion of the image data set extracted by the face detecting section 66a that includes the face region (for example, the first face data X). The second image data set may be the entire image data set, or the portion of the image data set extracted by the face detecting section 66a that includes the face region (for example, the second face data X').

Generation of pseudo three dimensional images by the digital camera is facilitated, by employing the reference face data, which are recorded in advance.

Note that the imaging control section 101 is not limited to automatically controlling the imaging operation. Alternatively, the imaging control section 101 may control the digital camera 1 such that imaging of the first image data set and the second image data set are not performed until the detected face is judged to be in a desired state, even if the shutter release button 7 is depressed. The imaging control section 101 may control the digital camera 1 such that imaging is enabled by depressing the shutter release button 7, only after it is judged that the detected face is in a desired state.

Next, a process according to a third embodiment performed by the digital camera 1 having the above construction will be described.

Figure 9:
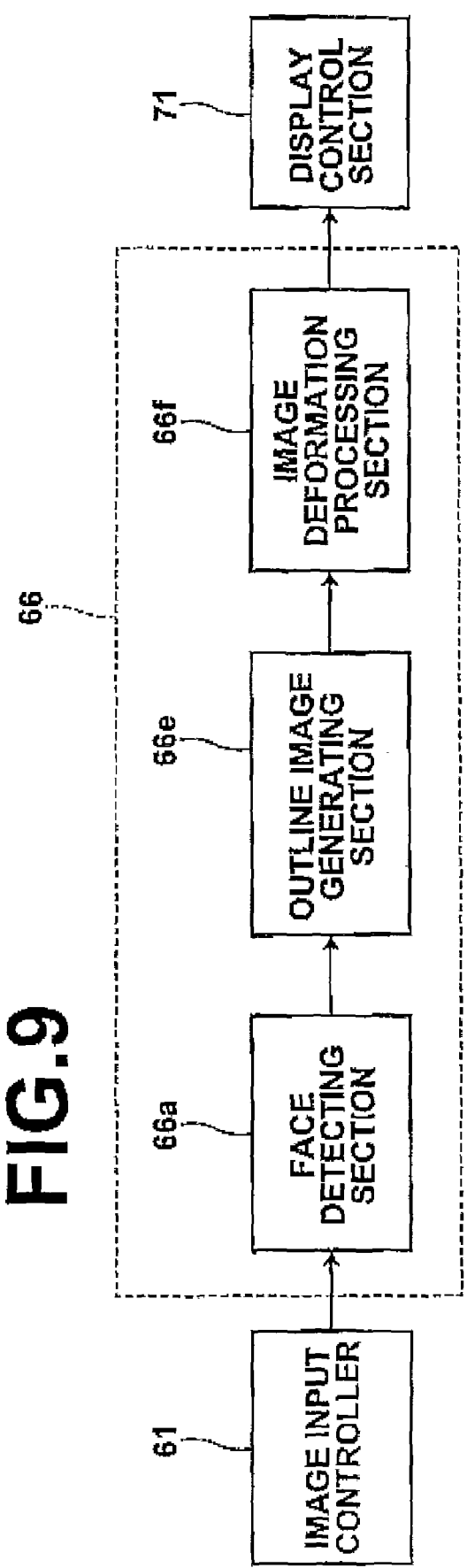
FIG. 9 is a functional block diagram of a third embodiment of the present invention.

FIG. 9 is a block diagram that illustrates the construction of the face detecting unit 66 of the digital camera 1. Here, only components of the first embodiment for which description is necessary are indicated in FIG. 9 and described. Components which are the same as those of the previous embodiments will be denoted with the same reference numerals, and detailed descriptions thereof will be omitted.

An outline image generating section 66e generates outline images, by extracting outlines of faces from image data sets that include faces. A high pass filtering process or a band pass filtering process is employed to extract the outlines of faces when generating the outline images.

An image deformation processing section 66f administers predetermined image processes (such as rotation or inversion, for example) onto the outline images, to generate deformed mask images.

Figure 10:
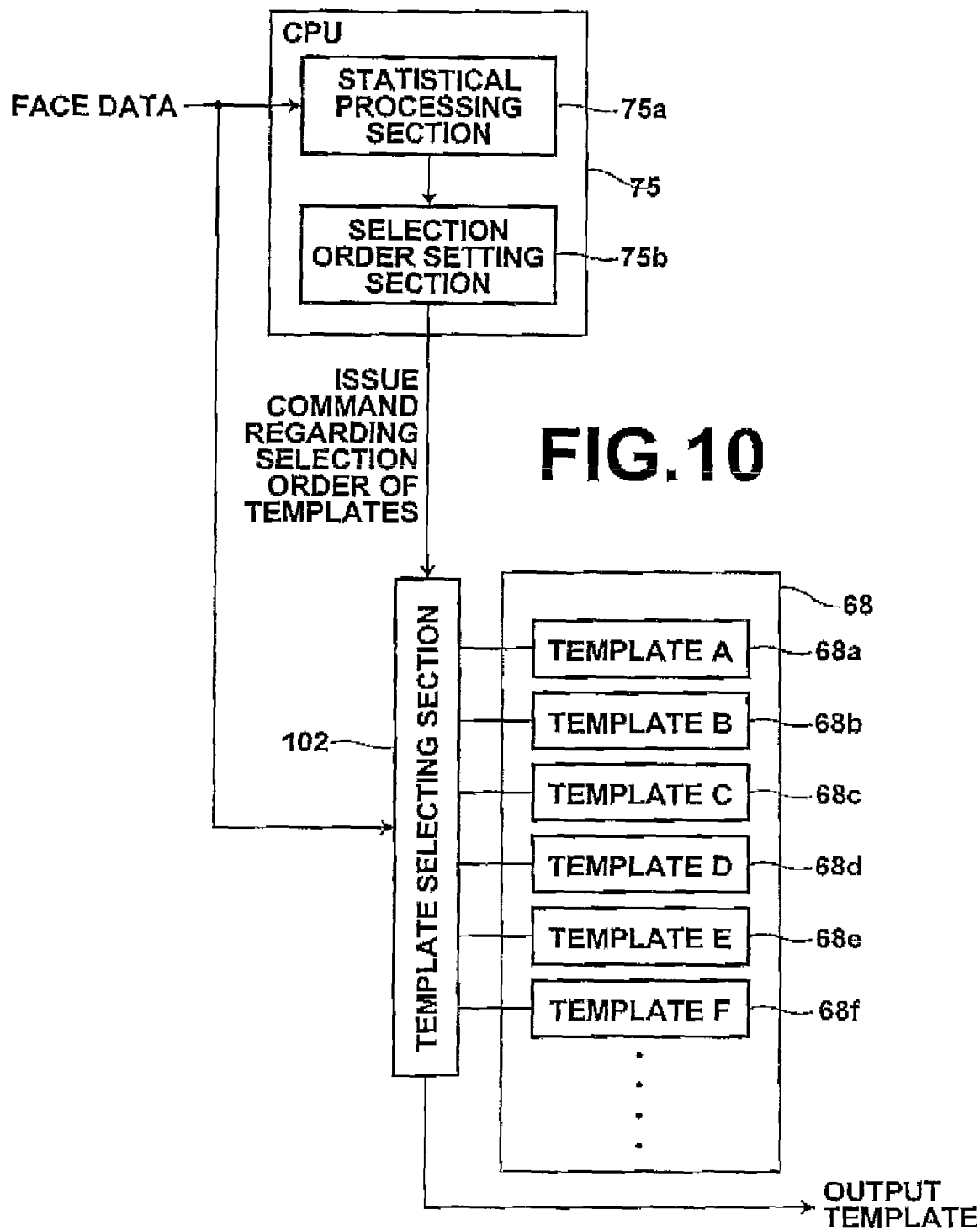
FIG. 10 is a block diagram that illustrates the structures for selecting templates in the third embodiment of the present invention.

FIG. 10 is a block diagram that illustrates the structure of a template selecting section 102 of the digital camera 1.

The template selecting section 102 selects two dimensional image data sets (two dimensional template data, such as templates of a plurality of facial outline images, for example) or three dimensional image data sets (three dimensional template data) from among those recorded in the frame memory 68, to be utilized as reference face data. Note that the two dimensional template data and the three dimensional template data may be recorded in the external recording medium 70 instead of the frame memory 68.

Figure 11:
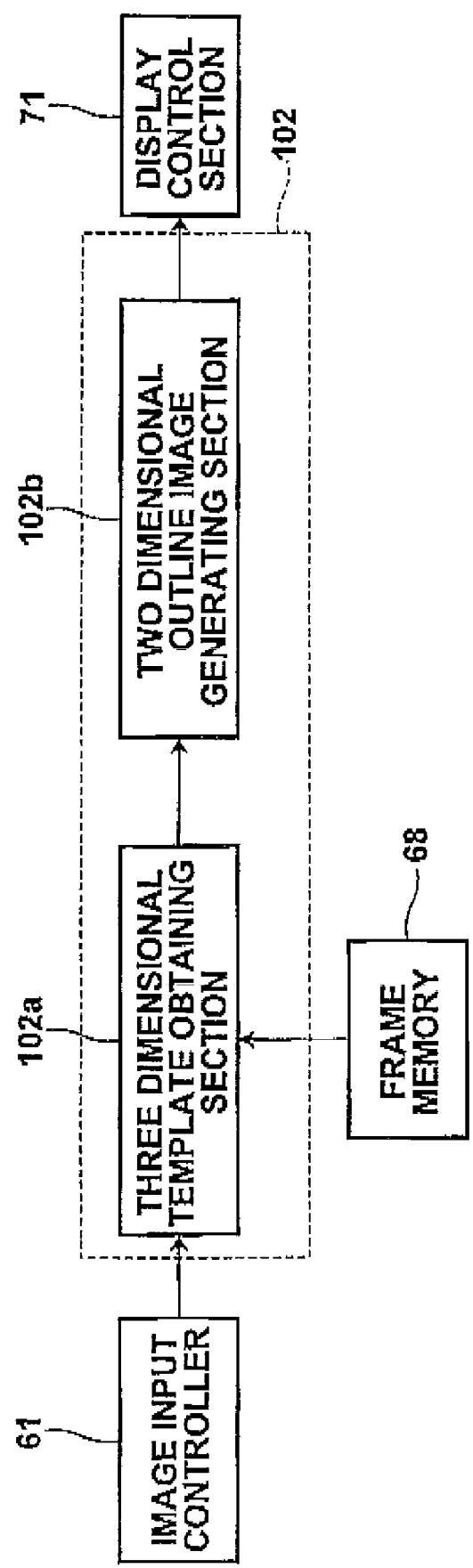
FIG. 11 is a flow chart that illustrates the sequence of steps of a process according to the third embodiment of the present invention.

FIG. 11 is a block diagram that illustrates the structure of the template selecting section 102 of the digital camera 1, in the case that three dimensional template data are utilized. The template selecting section 102 is mainly constituted by a three dimensional template obtaining section 102a and a two dimensional outline image generating section 102b.

The three dimensional template obtaining section 102a obtains three dimensional template data, which are recorded in the frame memory 68 of the external recording medium 70.

The two dimensional outline image generating section 102b generates first and second reference face data for generating pseudo three dimensional images, by projecting the three dimensional template data onto two dimensional spaces, taking predetermined angles and sizes into consideration.

A statistical processing section 75a calculates the frequency at which reference face data are utilized, to generate statistical data.

A selection order setting section 75b updates data that indicates the order in which templates are selected.

Figure 12:
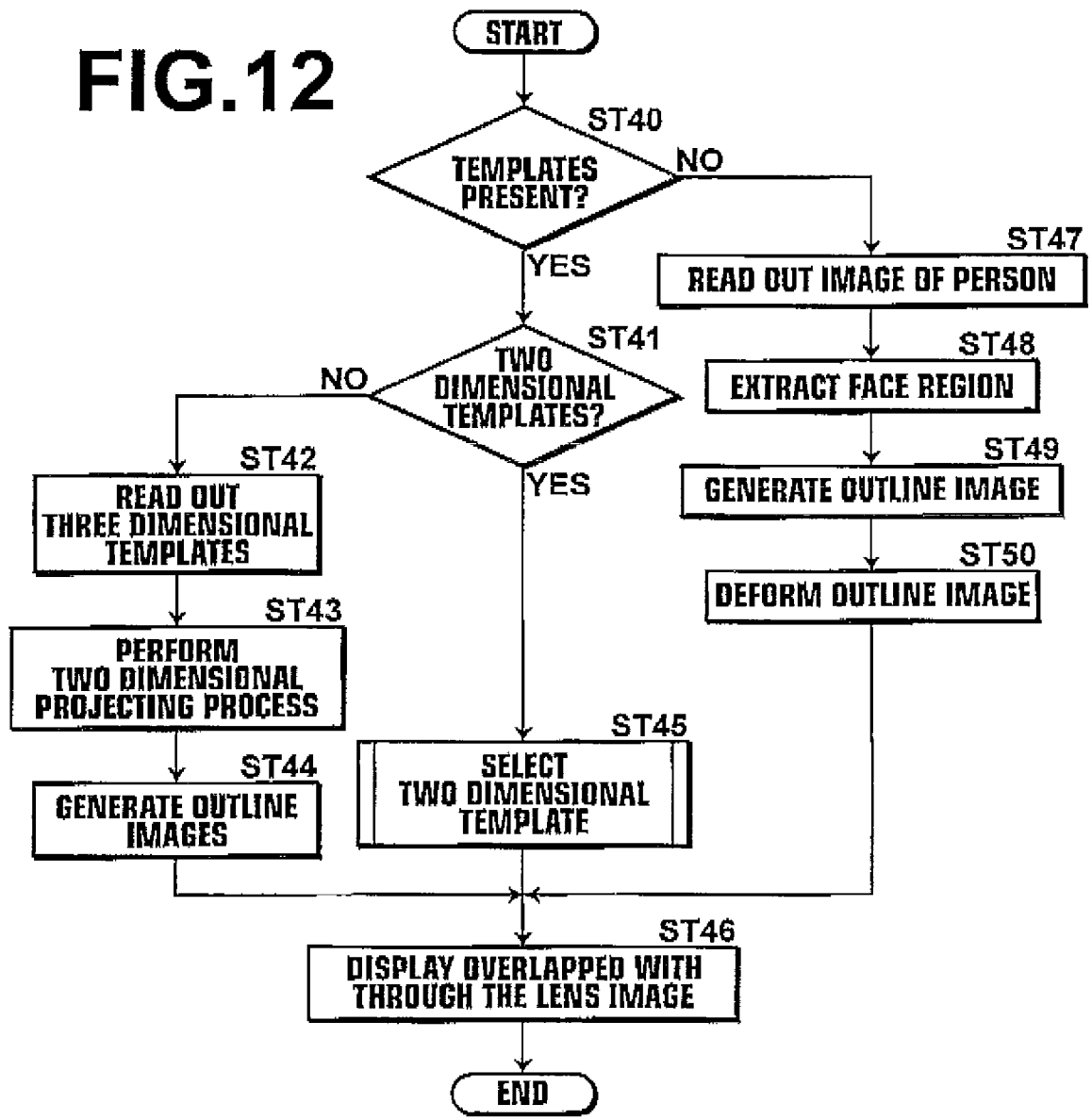
FIG. 12 is a flow chart that illustrates the sequence of steps of a process according to the third embodiment of the present invention.

FIG. 12 is a flow chart that illustrates the sequence of steps of the process performed by the digital camera 1.

The template selecting section 102 judges whether two dimensional or three dimensional template data are recorded in the frame memory. In the case that templates are recorded (step ST40: YES), the template selecting section 102 judges whether two dimensional template data are recorded in the frame memory 68. In the case that two dimensional template data are recorded in the frame memory 68 (step ST41: YES), a two dimensional template data set is selected from the frame memory 68 (step ST45).

Here, the template selecting section 102 selects an optimal two dimensional template data set from among the two dimensional template data recorded in advance in the frame memory 68, based on face data generated by the face data generating section 66b. There is a problem that selection of an optimal two dimensional template data set will take time, as the types and number of templates increase. Therefore, in order to solve this problem, the template selecting section 102 and the CPU 75 performs a statistical process after selection of a template, and an updating process to update the statistical data. FIG. 15 is a flow chart that illustrates the above processes, which are performed by the template selecting section 102 and the CPU 75.

The CPU 75 reads out a plurality of reference face data sets (two dimensional template data sets) which are recorded in the external recording medium 70, to employ the two dimensional template data sets as reference face data (step ST51). The statistical processing section 75a which is included in the CPU 75 calculates statistics regarding the frequency at which the reference face data sets were utilized in the past (step ST52), and updates the statistical data such that searching is initiated starting with statistically frequently utilized reference face data sets (step ST53). The selection order setting section 75b which is included in the CPU 75 updates the selection order (step ST55), in the case that the selection order for the templates is determined to be changed (step ST54: YES).

TABLE 2

EXAMPLE OF UPDATING ORDER OF SEARCH

| Template | Order Prior to Update | Frequency of Selection | Order Following Update |
|---|---|---|---|
| A (Large Face 0 Degrees) | 1 | 5 | 8 |
| B (Medium Face 0 Degrees) | 2 | 8 | 7 |
| C (Small Face 0 Degrees) | 3 | 3 | 9 |
| D (Large Face 5 Degrees Rightward) | 4 | 12 | 5 |
| E (Medium Face 5 Degrees Rightward) | 5 | 25 | 3 |
| F (Small Face 5 Degrees Rightward) | 6 | 9 | 6 |
| G (Large Face 10 Degrees Rightward) | 7 | 30 | 2 |
| H (Medium Face 10 Degrees Rightward) | 8 | 57 | 1 |
| I (Small Face 10 Degrees Rightward) | 9 | 20 | 4 |
| . | . | . | . |
| . | . | . | . |

The updated data utilizes the sizes and the sideways facing angles of the faces in the reference face data, for example. In the updated data, template H is utilized most frequently, and therefore becomes first in the selection order. The time spent searching for optimal templates can be reduced by adopting the above configuration, in which the search order is changed by the aforementioned statistical process.

In the case that the selection order is not to be changed (step ST54: NO), the selection order setting section 75b proceeds to the next step (step ST46).

Figure 13A:
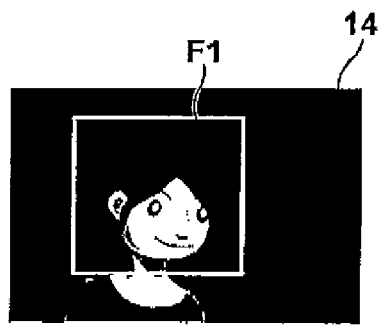
FIGS. 13A, 13B, and 13C illustrate an example of what is displayed on a monitor of a digital camera, and examples of reference images in the third embodiment of the present invention.
Figure 13B:

In the case that two dimensional template data are not recorded (step ST41: NO), the three dimensional template obtaining section 102a reads out three dimensional template data sets from the frame memory 8 (step ST42), and the two dimensional outline image generating section 102b performs the process of projecting the three dimensional template data onto two dimensional spaces (step ST43). The two dimensional outline image generating section 102b generates two dimensional template data sets, which are obtained by performing the projection process on the three dimensional template data. The outline image generating section 66e extracts the outline portions from the generated two dimensional template data sets, to generate outline images (step ST44). FIG. 13A illustrates a person who is displayed on the monitor 14, and FIG. 13B illustrates an outline image generated by the outline image generating section 66e.

Figure 13C:

On the other hand, in the case that no templates are recorded (step ST40: NO), a prerecorded image data set is read out from the external recording medium 70 (step ST47), and a face region is extracted from the image data set by the face detecting section 66a (step ST48). The face data generating section 66b generates face data regarding the extracted face region. The outline image generating section 66e extracts an outline from the generated ace data, to generate an outline image (step ST49). The image deformation processing section 66f administers deformation processes such as rotation and inversion onto the generated outline image (step ST50), to generate a final outline image. FIG. 13C illustrates an outline image which is generated via the image deformation processing section 66e in the case that no templates are recorded.

The outline image which is generated in the manner described above is designated to be a type of reference face data. The reference face data (including the outline image) is displayed on the monitor 14, overlapped with through the lens image data (step ST46).

Figure 14A:
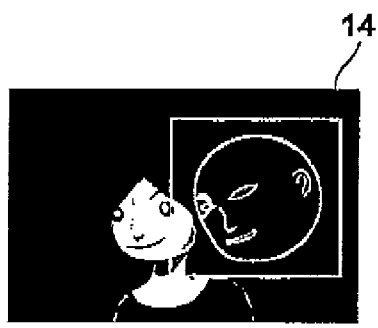
FIGS. 14A and 14B illustrate examples of overlapped display on the monitor of the digital camera in the third embodiment of the present invention.
Figure 14B:
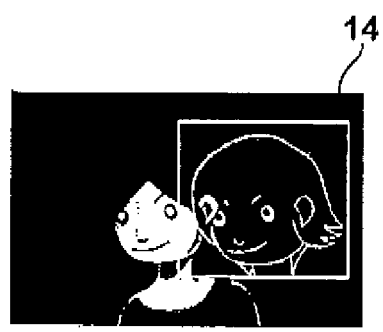

FIG. 14A illustrates a case in which templates were recorded (step ST40: YES) and an outline image is displayed on the monitor 14, overlapped with through the lens image data. FIG. 14B illustrates a case in which templates were not recorded (step ST40: NO) and an outline image is displayed on the monitor 14, overlapped with through the lens image data.

The configuration above enables imaging of two dimensional image data sets which are optimal for generating pseudo three dimensional image data sets. That is, obtainment of optimal two dimensional image data sets is made possible by displaying an outline image, which is generated based on a previously obtained image of a person, or by displaying a template, which is recorded in advance, overlapped with a through he image data set.

Next, a process according to a fourth embodiment performed by the digital camera 1 having the above construction will be described. The fourth embodiment is related to an imaging process when video images are obtained in the first through third embodiments described above. Here, only components which are different from those of the previous embodiments will be described. Components which are the same as those of the first through third embodiments will be denoted with the same reference numerals, and detailed descriptions thereof will be omitted.

Figure 16:
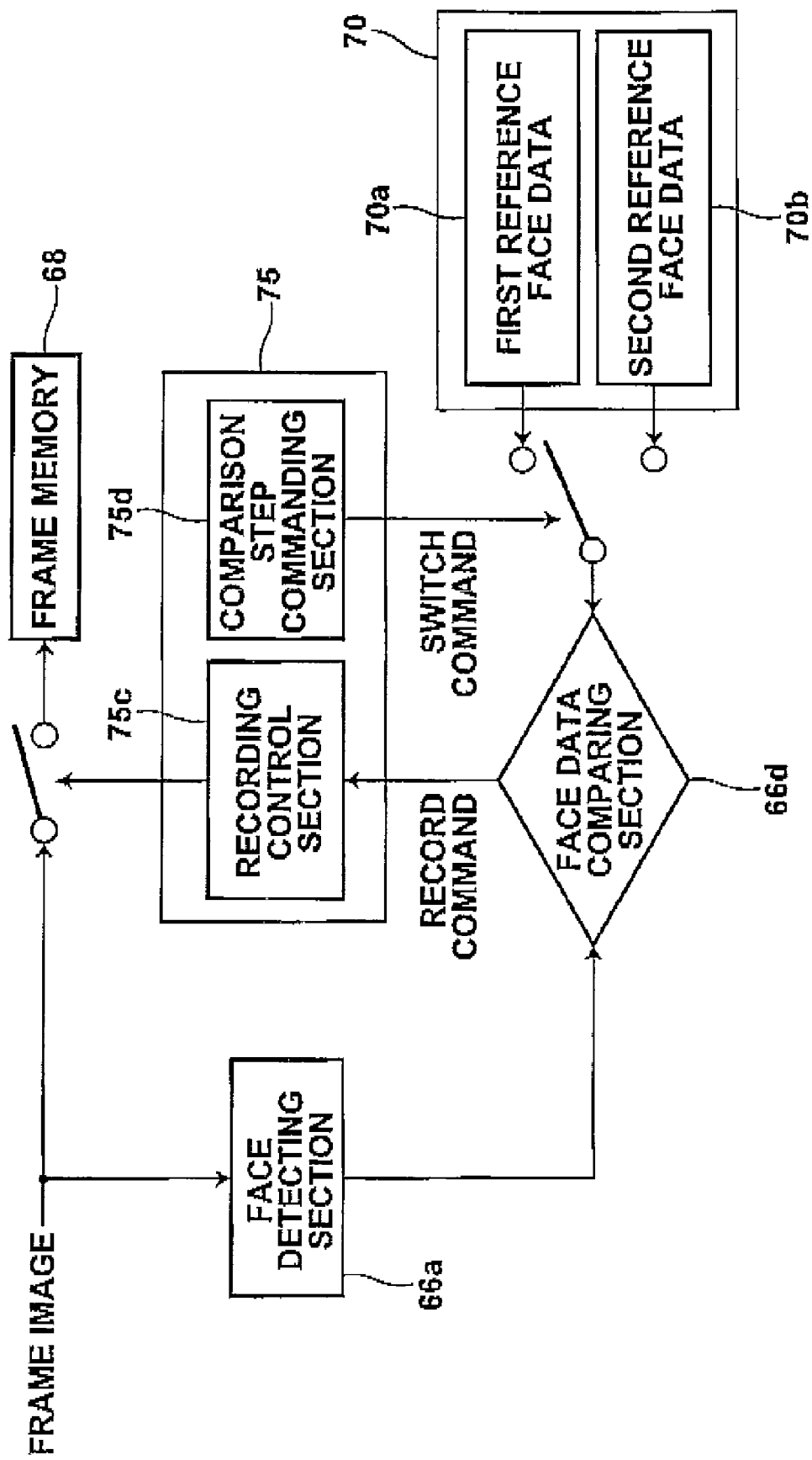
FIG. 16 is a functional block diagram of a fourth embodiment of the present invention.

FIG. 16 is a block diagram that illustrates the construction of the CPU 75 of the digital camera 1.

A recording control section 75c controls whether a specific frame within a video image (an $N^{th}$ frame, for example) is recorded in the frame memory 68 as a reference image.

A comparison step commanding section 75d issues commands to select one of a plurality of recorded reference face data sets. The comparison step commanding section 75d also issues commands to the face data comparing section 66d to calculate correlative values of the reference face data.

Figure 17B:
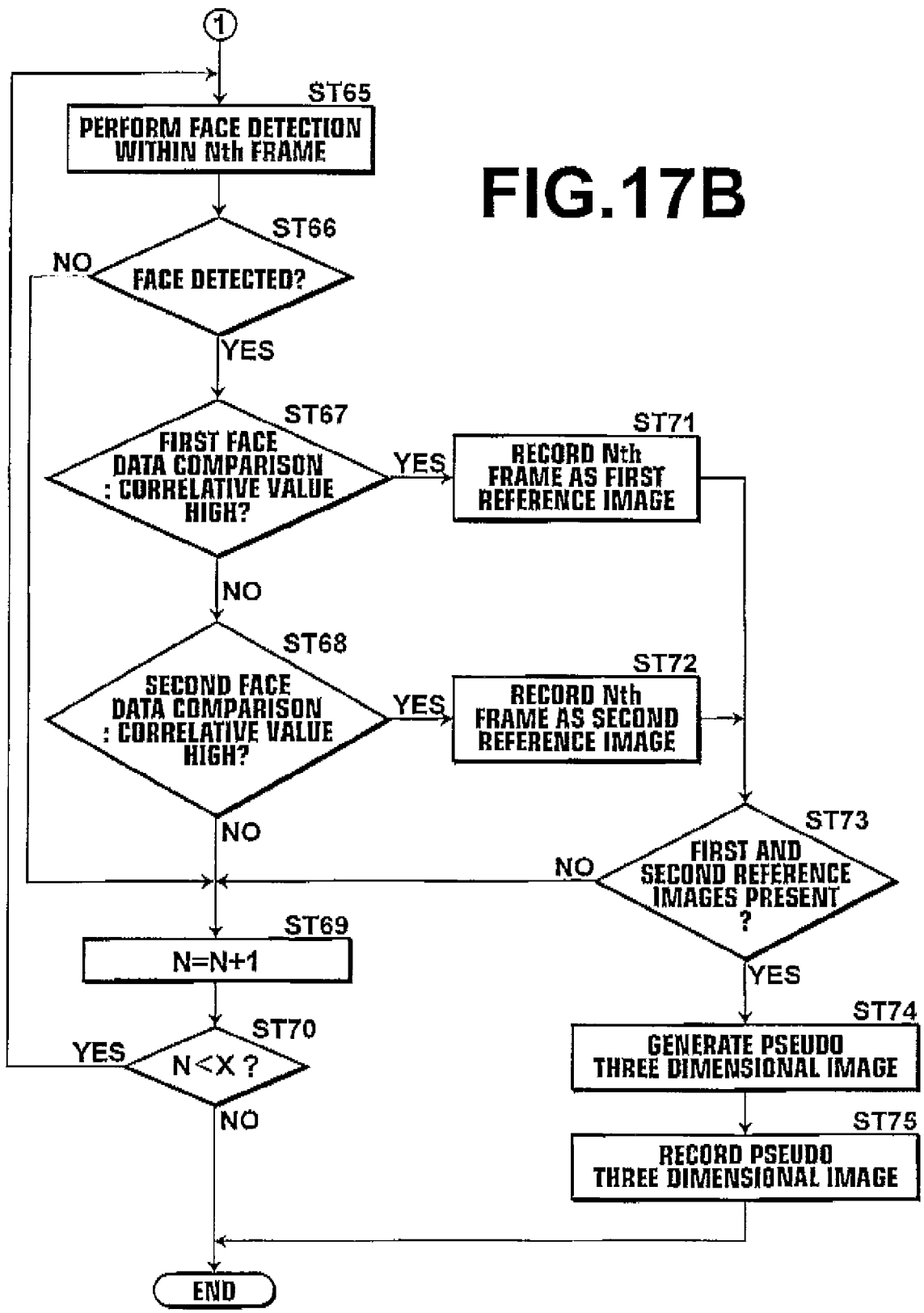
FIG. 17B is a second flow chart that illustrates the sequence of steps of a process according to the fourth embodiment of the present invention.

Next, a process according to a fourth embodiment performed by the digital camera 1 will be described. FIGS. 17A and 17B are flow charts that illustrate the sequence of steps of the process performed by the digital camera 1. As illustrated in FIG. 17A, a first video imaging operation is initiated (step ST60), and is continued until imaging is completed (step ST61: YES).

When imaging is completed by a user depressing the shutter release button 7 (step ST61: YES), the recorded video image is recorded in the external recording medium 70 (step ST62). The CPU 75 counts a total number X of frames of the recorded video image (step ST63). The CPU 75 also designates N as a number of processed frames (N=number of counted frames), and initializes the value of N at N=0 (step ST64). Then, as illustrated in FIG. 17B, the face detecting section 66a performs face detection with respect to an $N^{th}$ frame from among the frames of the recorded video image (step ST65). In the case that the face detecting section 66a does not detect a face (step ST66: NO), an addition process such as N=N+1 is performed (step ST69).

On the other hand, in the case that the face detecting section 66a detects a face (step ST66; YES), the comparison step commanding section 75d judges the similarity between face data of the face detected by the face detecting section 66a, and a first reference face data set, which is recorded in the external recording medium 70, by calculating the correlative value therebetween. In the case that the correlative value is high (step ST67: YES), the recording control section 75c receives a recording command to record the $N^{th}$ frame in the frame memory 68 from the face data comparing section 66d, and records the $N^{th}$ frame in the frame memory 68 (step ST71).

On the other hand, in the case that the correlative value is low (step ST67: NO), the comparison step commanding section 75d issues a switching command, to switch the target of comparison of the face data comparing section 66d from the first reference face data recorded in the external recording medium 70 to a second reference face data set. The comparison step commanding section 75d judges the similarity between face data of the face detected by the face detecting section 66a, and the second reference face data set, which is recorded in the external recording medium 70, by calculating the correlative value therebetween. In the case that the correlative value is high (step ST68: YES), the recording control section 75c receives a recording command to record the $N^{th}$ frame in the frame memory 68 from the face data comparing section 66d, and records the $N^{th}$ frame in the frame memory 68 (step ST72).

In the case that first and second reference images are not recorded in the frame memory (step ST73: NO), an addition process, such as N=N+1, is performed (step ST69).

The addition process, such as N=N+1 (step ST69), is also performed in the case that the correlative value between the face data of the detected face and the second reference face data is lower than a predetermined value (step ST68: NO).

In the case that N is less than the total number of frames X (step ST70: YES), face detection is repeatedly performed.

On the other hand, in the case that a first reference image and a second reference image are recorded in the frame memory 68 (step ST73: YES), the pseudo three dimensional image generating section 100 generates a pseudo three dimensional image data set from the first and second reference images (step ST74), and records the generated pseudo three dimensional image data set in the external recording medium 70 (step ST75). The process ends when N equals the total number of frames X (step ST70: NO) or when the pseudo three dimensional image is recorded (step ST75).

The above configuration enables extraction of two dimensional image data sets which are suited for generating pseudo three dimensional images from video images.

Figure 18:
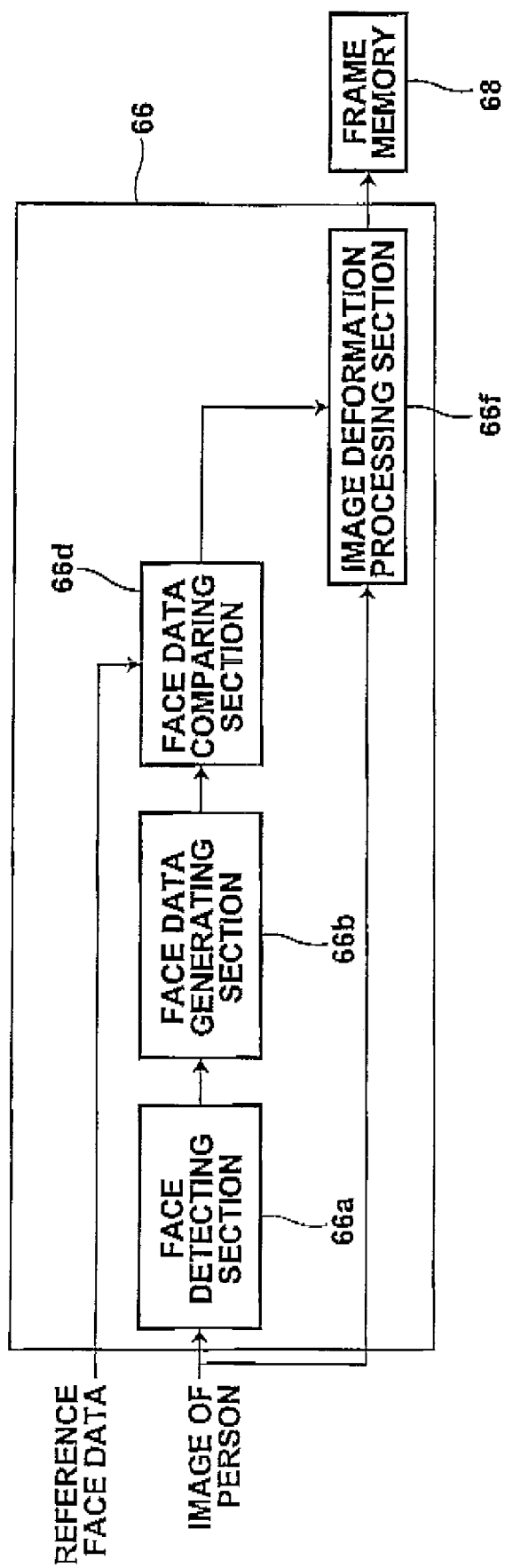
FIG. 18 is a functional block diagram of a fifth embodiment of the present invention.

Next, a process according to a fifth embodiment performed by the digital camera 1 having the above construction will be described. FIG. 18 is a block diagram that mainly illustrates the construction of the face detecting unit 66 of the digital camera 1. Here, only components which are different from those of the first through fourth embodiment will be described. Components which are the same as those of the first through fourth embodiment will be denoted with the same reference numerals, and detailed descriptions thereof will be omitted.

Figure 19:
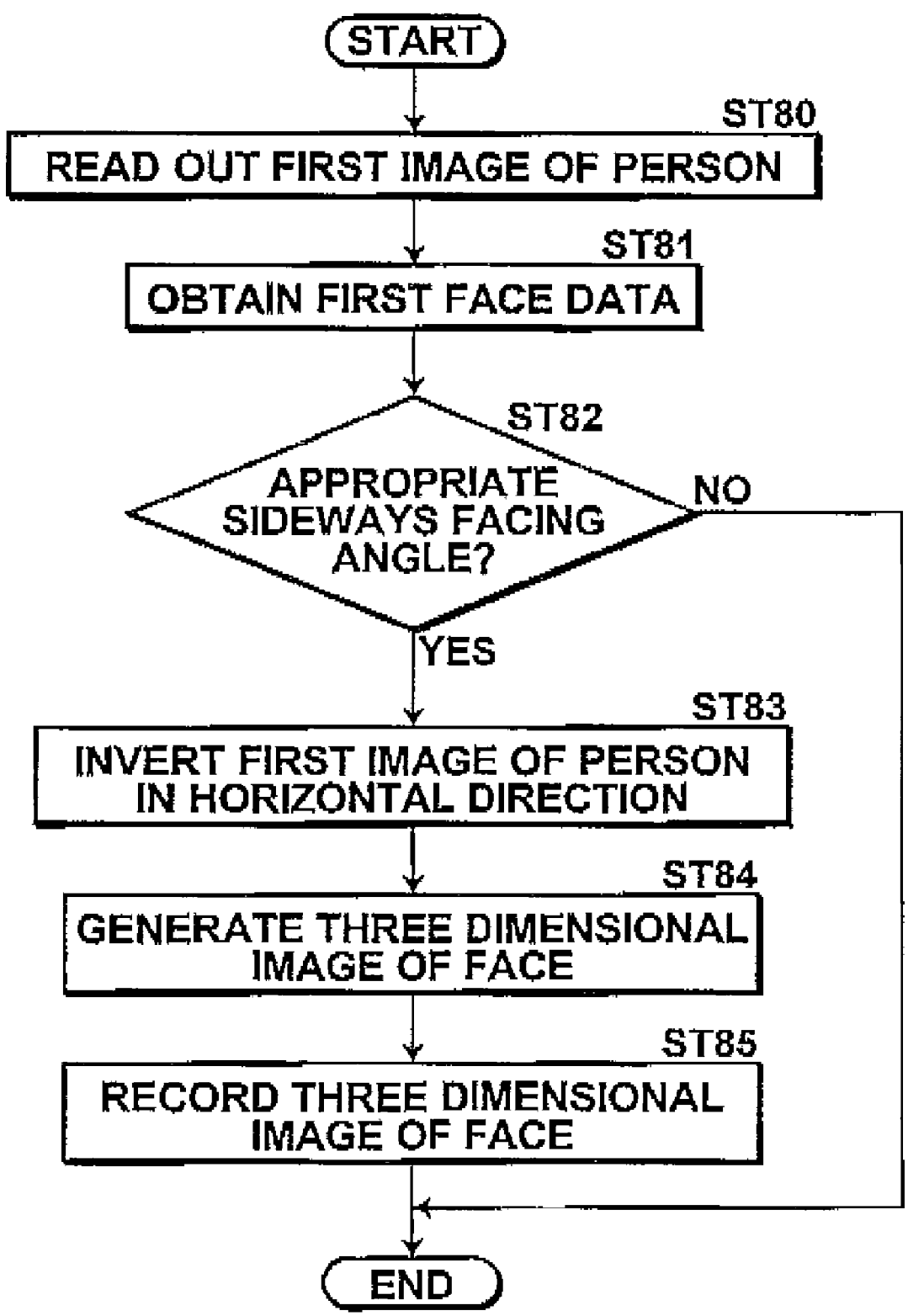
FIG. 19 is a flow chart that illustrates the sequence of steps of a process according to the fifth embodiment of the present invention.

FIG. 19 is a flow chart that illustrates the sequence of steps of the process performed by the digital camera 1. As illustrated in FIG. 19, first, the face detecting section 66a reads out an image data set, detects a face from within the image data set, and obtains a portion of the image data set that includes the detected face as a first image of a person (step ST80). The face data generating section 66b generates face data from the first image of the person (step ST81). The face data generating section 66b judges whether the obtained face data represents an angle within a predetermined range (an appropriate range). When the sideways facing angle of the face is designated as Z, and threshold values for angles are designated as A and B, the predetermined range is a range A<Z<B. If the sideways facing angle Z is within the predetermined range (step ST82: YES), the face data generating section 66b generates an inverted image, by inverting the image of the person in the horizontal direction, and designates the inverted image as a second image of the person (step ST83). The pseudo three dimensional image generating section 100 generates a pseudo three dimensional image data set (three dimensional image of the face) from the first and second images of the person (step ST84). The pseudo three dimensional image generating section 100 records the generated pseudo three dimensional image data set in the external recording medium 70 (step ST85).

The above configuration enables generation of pseudo three dimensional images from single image, by generating the second image of the person as a pseudo two dimensional image data set.

In the embodiments described above, the image data sets were displayed on the monitor 14 of the imaging apparatus. Alternatively, the imaging apparatus may be connected to a display device such as a television in a wired manner or wirelessly, and the image data sets may be displayed by the display device.

Note that the imaging apparatus according to the present invention was described as digital cameras in the embodiments above. However, the present invention is not limited to application to digital cameras. The present invention may be applied to all types of imaging devices that record still images or video images, such as cellular phones with built in cameras, and other electronic devices having electronic imaging functions.

What is claimed is:

1. An imaging apparatus, comprising:
an image-obtaining hardware device, for obtaining through the lens image data sets and image data sets by imaging subjects;
a face detecting unit, for detecting faces from within the through the lens image data sets;
a recording unit, for recording first image data sets obtained by the image-obtaining hardware device that include the faces;
a reference image generating unit, for generating reference image data sets which are employed to generate pseudo three dimensional images from the recorded first image data sets, by calculating the sizes and the sideways facing angles of the faces included in the first image data sets, maintaining the sizes of the faces, and by converting the first image data sets such that the sideways facing angles are changed;
an image processor configured to calculate correlative values between the through the lens image data that include new faces and the reference image data to compare the two, when the new faces are detected by the face detecting unit;
a control unit for enabling obtainment of second image data sets that include the new faces by the image-obtaining hardware device, when the correlative values calculated by the comparing unit are greater than a predetermined value; and
a pseudo three dimensional image generating unit, for generating pseudo three dimensional images from the second image data sets, which are obtained by the image-obtaining hardware device, and the first image data sets, which are recorded in the recording unit.

2. An imaging apparatus, comprising:
an image-obtaining hardware device, for obtaining through the lens image data sets and image data sets by imaging subjects;
a face detecting unit, for detecting faces from within the through the lens image data sets;
a recording unit, for recording first and second reference image data sets, which are employed to generate pseudo three dimensional images; and
a pseudo three dimensional image generating unit that uses an image processor to calculate correlative values between the through the lens image data sets that include faces detected by the face detecting unit and the first reference image data sets, for calculating correlative values between the through the lens image data sets that include new faces detected by the face detecting unit and the second reference image data sets, and that generates pseudo three dimensional images from first image data sets, which are obtained by the image-obtaining hardware device and include the faces, when the correlative values between the through the lens image data sets that include faces detected by the face detecting unit and the first reference image data sets are greater than a predetermined value, and second image data sets, which are obtained by the image-obtaining hardware device and include the new faces, when the correlative values between the through the lens image data sets that include faces detected by the face detecting unit and the second reference image data sets are greater than a predetermined value.

3. An imaging apparatus as defined in claim 2, further comprising:
a display unit for displaying the through the lens image data sets; wherein:
the display unit displays one of the two types of reference image data sets overlapped with the through the lens image data sets, when faces are detected by the face detecting unit.

4. An imaging apparatus as defined in claim 3, further comprising:
a selecting unit that enables selection of the reference image data set to be displayed by the display unit.

5. An imaging apparatus as defined in claim 2, further comprising:
a display unit for displaying the through the lens image data sets;
an outline image generating unit, for extracting outlines from the through the lens image data sets to generate outline images, when faces are detected by the face detecting unit; and a mask generating unit, for administering predetermined image processes onto the outline images to generate deforming mask images; wherein:

the display unit displays the deforming mask images overlapped with the through the lens image data sets.

6. An imaging apparatus as defined in claim 2, further comprising:

a reference image converting unit, for converting three dimensional data of the reference image data sets, which are employed to generate pseudo three dimensional images, to generate the first and second reference image data sets; wherein:

the recording unit records the first and second reference image data sets, which have been converted by the reference image converting unit, and the three dimensional data.

7. An imaging apparatus as defined in claim 6, further comprising:

a display unit for displaying the through the lens image data sets;

an outline image generating unit, for extracting outlines from the through the lens image data sets to generate outline images, when faces are detected by the face detecting unit; and a mask generating unit, for administering predetermined image processes onto the outline images to generate deforming mask images; wherein:

the display unit displays the deforming mask images overlapped with the through the lens image data sets.

8. An imaging method, comprising the steps of:

obtaining, via an image-obtaining hardware device configured therefor, through the lens image data sets by imaging subjects;

detecting faces from within the through the lens image data sets;

recording first image data sets obtained by the imaging means that include the faces;

generating reference image data sets which are employed to generate pseudo three dimensional images from the obtained first image data sets, by calculating the sizes and the sideways facing angles of the faces included in the first image data sets, maintaining the sizes of the faces and by converting the first image data sets such that the sideways facing angles are changed;

using an image processor to calculate correlative values between the through the lens image data that include new faces and the reference image data to compare the two, when the new faces are detected by the face detecting means;

obtaining second image data sets that include the new faces, when the calculated correlative values are greater than a predetermined value; and generating pseudo three dimensional images from the first image data sets and the second image data sets.

9. An imaging method, comprising the steps of:

obtaining, via an image-obtaining hardware device configured therefor, through the lens image data sets by imaging subjects;

detecting faces from within the through the lens image data sets;

recording first and second reference image data sets, which are employed to generate pseudo three dimensional images, in advance;

using an image processor to calculate correlative values between the through the lens image data sets that include detected faces and the first reference image data sets, and obtaining first image data sets when the calculated correlative values are greater than a predetermined value;

calculating correlative values between the through the lens image data sets that include new faces and the second reference image data sets when the new faces are detected, and obtaining second image data sets that include the new faces when the calculated correlative values are greater than a predetermined value; and generating pseudo three dimensional images from the first image data sets and the second image data sets.

10. A non-transitory computer-readable medium having stored thereon an imaging program that causes a computer to execute the functions of:

obtaining through the lens image data sets by imaging subjects;

detecting faces from within the through the lens image data sets;

recording first image data sets obtained by the imaging means that include the faces;

generating reference image data sets which are employed to generate pseudo three dimensional images from the recorded first image data sets, by calculating the sizes and the sideways facing angles of the faces included in the first image data sets, maintaining the sizes of the faces and by converting the first image data sets such that the sideways facing angles are changed;

calculating correlative values between the through the lens image data that include new faces and the reference image data to compare the two, when the new faces are detected by the face detecting means;

obtaining second image data sets that include the new faces, when the calculated correlative values are greater than a predetermined value; and generating pseudo three dimensional images from the first image data sets and the second image data sets.

11. A non-transitory computer-readable medium having stored thereon an imaging program that causes a computer to execute the functions of:

obtaining through the lens image data sets by imaging subjects;

detecting faces from within the through the lens image data sets;

recording first and second reference image data sets, which are employed to generate pseudo three dimensional images, in advance;

calculating correlative values between the through the lens image data sets that include detected faces and the first reference image data sets, and obtaining first image data sets when the calculated correlative values are greater than a predetermined value;

calculating correlative values between the through the lens image data sets that include new faces and the second reference image data sets when the new faces are detected, and obtaining second image data sets that include the new faces when the calculated correlative values are greater than a predetermined value; and generating pseudo three dimensional images from the first image data sets and the second image data sets.

* * * * *